(12) United States Patent
Karidis et al.

(10) Patent No.: US 6,362,440 B1
(45) Date of Patent: Mar. 26, 2002

(54) FLEXIBLY INTERFACEABLE PORTABLE COMPUTING DEVICE

(75) Inventors: John Peter Karidis, Ossining; Krishna Sundaram Nathan, New York, both of NY (US); Ronald Alan Smith, Wake Forest; Robert Edward Steinbugler, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,391

(22) Filed: Apr. 30, 1998

Related U.S. Application Data

(60) Provisional application No. 60/079,745, filed on Mar. 27, 1998.

(51) Int. Cl.[7] .......................... G09G 5/00; G08C 21/00
(52) U.S. Cl. ................. 178/18.01; 178/18.03; 178/19.01; 178/19.03; 345/168; 345/169
(58) Field of Search .................. 345/156, 168, 345/169, 158, 173, 174, 175, 179; 178/18.01, 18.03, 18.05, 18.06, 18.07, 18.09, 18.1, 19.01, 19.03

(56) References Cited

U.S. PATENT DOCUMENTS

| | | | |
|---|---|---|---|
| 4,136,336 A | 1/1979 | Abe et al. ................ 340/365 S |
| 4,656,317 A | 4/1987 | Tsugei et al. .................. 178/18 |
| 4,661,656 A | 4/1987 | Rodgers et al. ............... 178/18 |
| 4,672,154 A | 6/1987 | Rodgers et al. ............... 178/19 |
| 4,745,491 A | 5/1988 | Kishi et al. ................... 358/300 |
| 4,745,565 A | * 5/1988 | Garwin et al. ............ 178/18.01 |
| 4,870,658 A | * 9/1989 | Shibuya et al. ............. 360/712 |
| 4,926,010 A | * 5/1990 | Citron ...................... 178/18.03 |
| 5,049,862 A | 9/1991 | Dao et al. ................... 340/706 |
| 5,177,328 A | 1/1993 | Ito et al. ......................... 178/18 |
| 5,202,844 A | 4/1993 | Kamio et al. ............... 364/709 |
| 5,243,149 A | 9/1993 | Comerford et al. ............ 178/18 |
| 5,508,720 A | 4/1996 | DiSanto et al. ............. 345/169 |
| 5,598,487 A | 1/1997 | Hacker et al. .............. 382/313 |
| 5,838,819 A | 11/1998 | Ruedisueli et al. ......... 382/187 |

FOREIGN PATENT DOCUMENTS

| | | | |
|---|---|---|---|
| EP | 0656120 A2 | * 10/1991 |
| EP | 0 766 168 A2 | 4/1997 |
| EP | 0 774 708 A2 | 5/1997 |
| GB | 2 305 715 A | 4/1997 |

\* cited by examiner

*Primary Examiner*—Vijay Shankar
(74) *Attorney, Agent, or Firm*—Heslin Rothenberg Farley & Mesiti P.C.

(57) ABSTRACT

A flexibly interfaceable portable computing device includes a display coupled to a processor, which is coupled or selectively coupled to either or both of a keyboard and a recording unit. The display and the keyboard provide a first user interface to the processor. The recording unit is superimposable with a removable markable surface. A stylus allows user marking on the markable surface. The stylus provides a stroke signal and a stroke mark. The recording unit, the markable surface, and the stylus provide a second user interface to the processor. Optionally, the display also contributes to providing the second user interface to the processor. Switching among viewing modes for the display, and synchronization of information between the processor and a processor of the recording unit are also provided. A casing can enfold the display, the keyboard, and the recording unit to form a relatively slim profile. A portable computer system can have a display, a keyboard, and thick components enfolded and/or located within an overall thickness substantially equal to a sum of a first thickness for the display plus a second thickness for the keyboard, to present a slim profile.

74 Claims, 37 Drawing Sheets

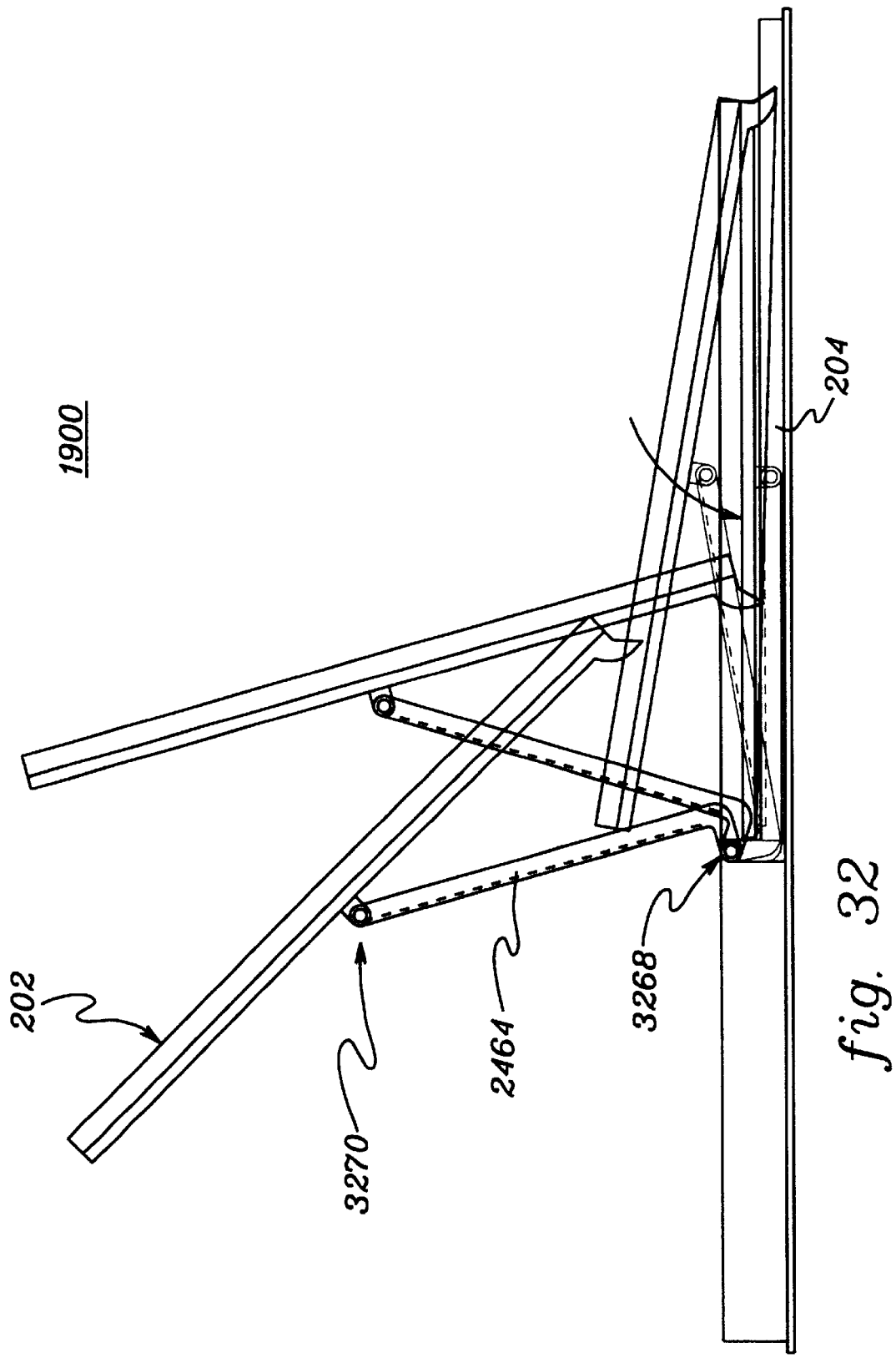

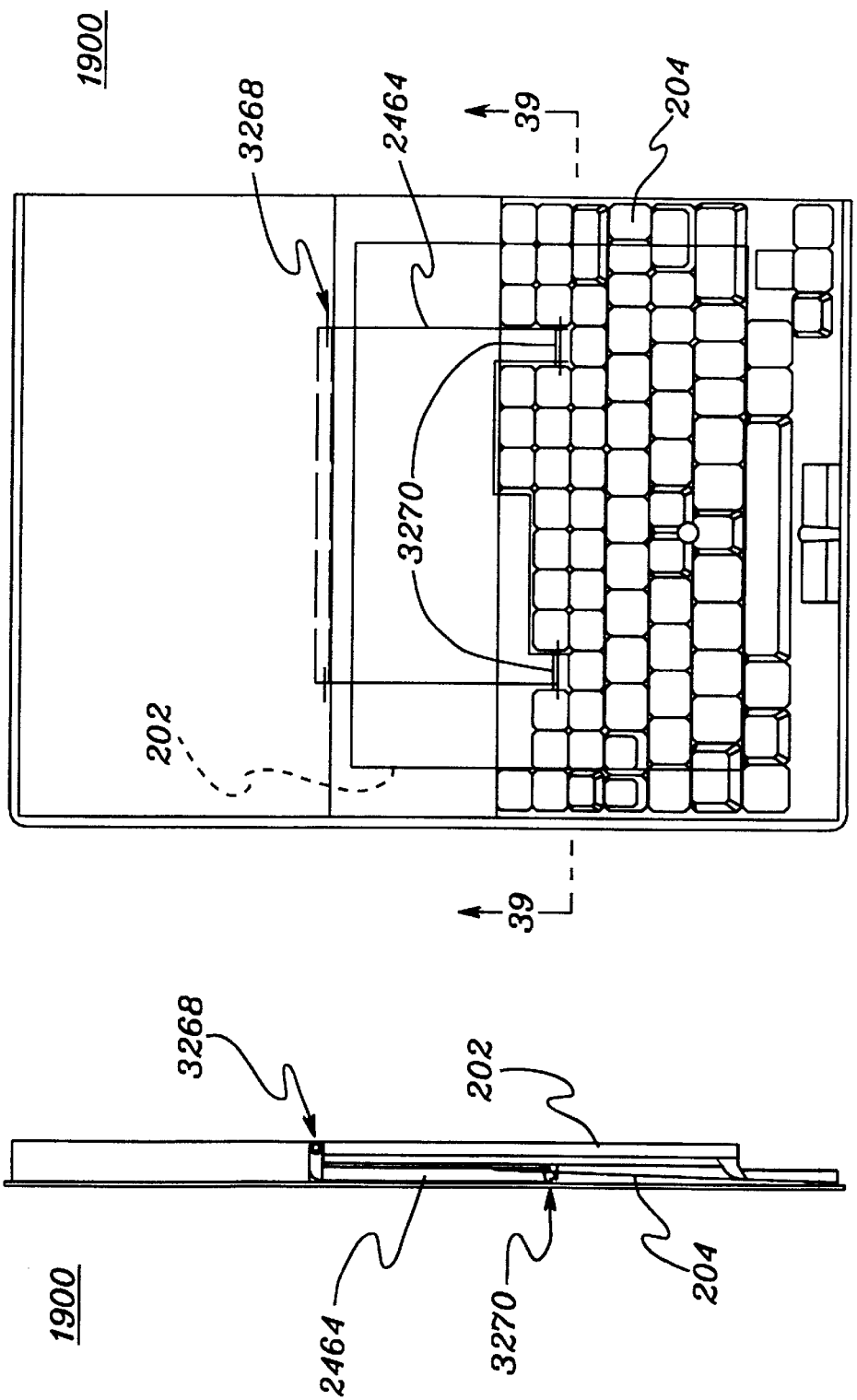

FLEXIBLY INTERFACEABLE PORTABLE COMPUTING DEVICE

CROSS-REFERENCE TO RELATED APPLICATION

This application contains subject matter which is related to the subject matter of the following application, which is assigned to the same assignee as this application. The below-listed application is hereby incorporated herein by reference in its entirety:

"METHODS, SYSTEMS AND PRODUCTS PERTAINING TO A DIGITIZER FOR USE IN PAPER BASED RECORD MAKING SYSTEMS," by Clary et al., Ser. No. 08/747,735, filed Nov. 12, 1996.

This application claims priority from U.S. Provisional Application 60/079,745, filed Mar. 27, 1998, entitled "Flexibly Interfaceable Portable Computing Device".

TECHNICAL FIELD

This invention relates, generally, to portable computers and, more particularly, to interfaces for portable computers employing a display, a keyboard, and a handwriting recording unit.

BACKGROUND ART

Computerized recording units to digitize text concurrently with hand writing thereof so that the handwritten text can be processed as data are known. Such digitization equipment can, for example, employ a digitizing tablet to generate data that represents coordinates of an electronic stylus applied thereto. In one such system described in the above-referenced, commonly assigned application, the digitizing tablet can generate positional information by detecting emissions of a first radio frequency from the stylus. The stylus can further include an electronic inking tip, such as a pressure sensor located therein for generating a second radio frequency when the stylus is in contact with a writing surface. By monitoring these first and second radio frequencies across a radio-sensitive grid, the digitizing tablet can generate a data stream representative of strokes of the stylus. That is, text written on or over the surface of the digitizing tablet can be recorded as "stroke" data. In addition, the tip of the stylus can have physical inking capabilities that allow concurrent physical marking of paper laid atop the digitizing tablet. In such recording units, recognition processes can convert "stroke" data into character strings. Plus, image data can be generated from "stroke" data in order to graphically display the strokes (e.g., on a limited size LCD display screen).

It would be desirable to be able to employ such a recording unit, paper, and stylus to provide an additional user interface to a laptop or notebook computer. Available laptop or notebook computers typically allow user interaction through a keyboard and display coupled to a processor. However, in many situations, it is desirable, familiar, and comfortable for a user to take notes or enter data with a stylus and paper, rather than, or in addition to, through the keyboard. Exemplary situations include attendance at an office meeting or a group conference, potentially accompanied by presentations, lectures, touring and dining. In such circumstances, typing at a keyboard can be disruptive, distracting, distancing and inconvenient. Moreover, it is often desirable to have available a physical copy of notes, such as for photocopying, transmitting by facsimile, or transferring by hand. Furthermore, it remains desirable to allow easy access (e.g., during breaks of business travel) to an electronic copy of any notes taken, as well as switching or selecting between handwriting and keyboarding, for reproduction, distribution, manipulation, processing and archiving of the information, plus integration of the information with data already resident on a disk or other memory of the computer.

Thus, for a laptop or notebook computer with a display, a need exists for allowing user selection of access thereto through a keyboard and/or through a recording unit, markable surface, and stylus. A further need exists for a capability allowing selective coupling of the recording unit and/or the keyboard. A still further need exists for a device embodying such features to be portable and conveniently, compactly, and attractively packaged.

SUMMARY OF THE INVENTION

Pursuant to the present invention, shortcomings of the existing art are overcome and additional advantages provided through the provision of flexible interfacing and portability capabilities of a computing device. A display is coupled to a processor. The processor is coupled, or selectively coupled, to either or both of a keyboard and a handwriting recording unit. The display and the keyboard provide a first user interface to the processor. The recording unit includes a working surface thereon. The working surface is superimposable with a removable markable surface. A stylus allows user marking on the markable surface when the working surface is superimposed with the markable surface. The stylus provides a stroke signal and a stroke mark. The stroke signal conveys to the recording unit a section of information. The stroke mark conveys to the markable surface the section of information. The recording unit, the markable surface, and the stylus provide a second user interface to the processor. Optionally, the display also contributes to providing the second user interface to the processor.

In another aspect of the invention, a logic design implementation coupled to the processor allows user switching among viewing modes for the display. The viewing modes can include portrait and landscape modes.

In yet another aspect of the present invention, a logic design implementation coupled to the processor serves to switch among viewing modes for the display. The logic design implementation can switch among the viewing modes responsive to status of one or more of the keyboard and the recording unit.

The viewing modes can include portrait and landscape modes. The logic design implementation can switch to portrait mode when the recording unit is coupled to the processor and in use. The logic design implementation can switch to landscape mode when the keyboard is coupled to the processor and in use.

The recording unit can comprise a second display. The processor can be referred to as a first processor, and the recording unit can comprise a second processor. The first and second processors can be coupled to respective first and second logic design implementations which serve to synchronize information between the first and second processors.

The recording unit can be selectively coupled to said first processor. The first and second logic design implementations can serve to synchronize information between the first and second processors when the recording unit is coupled to the first processor.

In another aspect of the present invention, a casing can be connected with the display, the keyboard, and the handwriting recording unit. Enfolding of the display, the keyboard, and the recording unit in the casing forms a relatively slim profile.

The handwriting recording unit can be selectively separable for independent use. Optical, electrical, wireless, infrared, radio-frequency, mechanical and/or other link(s) can allow the recording unit to be coupled to the (e.g., first) processor. Similarly, optical, electrical, wireless, infrared, radio-frequency, mechanical and/or other link(s) can allow the keyboard to be coupled to the (e.g., first) processor.

The display can be pivotally connected to a hinge connected to the casing. The keyboard can be pivotally connected to a hinge connected to the casing. The recording unit can be pivotally connected to a hinge connected to the casing. Optionally, a given hinge or the like may be shared.

The casing can include one or more pockets. A portion of the casing can include aluminum. An exterior surface of the casing can include leather and/or a leather-like texture.

The display can include a touch screen. Also, the touch screen can provide a user interface to a processor. The stylus can provide selectable first and second operating modes thereof. In addition, the first operating mode can serve to provide the stroke signal and the stroke mark. Moreover, the second operating mode can serve to provide a stroke signal for pointing and/or drawing with respect to the display. The stylus and the device can include a wireless link therebetween. The stylus can include a microphone. Also, the microphone can provide a user interface to processor(s).

In a still further aspect, a portable computer system includes a display, a keyboard, and a plurality of thick components. The display, the keyboard, and the thick components can be enfolded and/or located within an overall thickness substantially equal to a sum of a first thickness for the display plus a second thickness for the keyboard, to present a slim profile.

In one aspect, the system can comprise first and second (e.g., transverse) sections. Also, the display and the keyboard can be enfolded and/or located within the first section, and the thick components can be located within the second section. The thick components can include a battery, a hard file, a PCMCIA slot, a connector, a heat sink, a processor, and/or a cooling fan. In one example, a first part of a support arm can be pivotally connected with a position of the system, and a second part of the support arm can be pivotally connected with the display.

Thus, the present invention advantageously provides a first adaptable user interface to a processor and display through a keyboard, and a second adaptable user interface to the processor and display through a recording unit, markable surface, and stylus. These interfaces are familiar and comfortable to a user. Moreover, the present invention reduces bulkiness and increases convenience in creating, carrying, and utilizing electronic and physical records.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 32 is a sequenced, side representation of a ninth exemplary embodiment of the computing device of the present invention;

FIG. 33 is a plan view of a subsystem of the computing device of FIG. 32;

FIG. 34 is a side representation of the subsystem of FIG. 33;

BEST MODE FOR CARRYING OUT THE INVENTION

Figure 1:
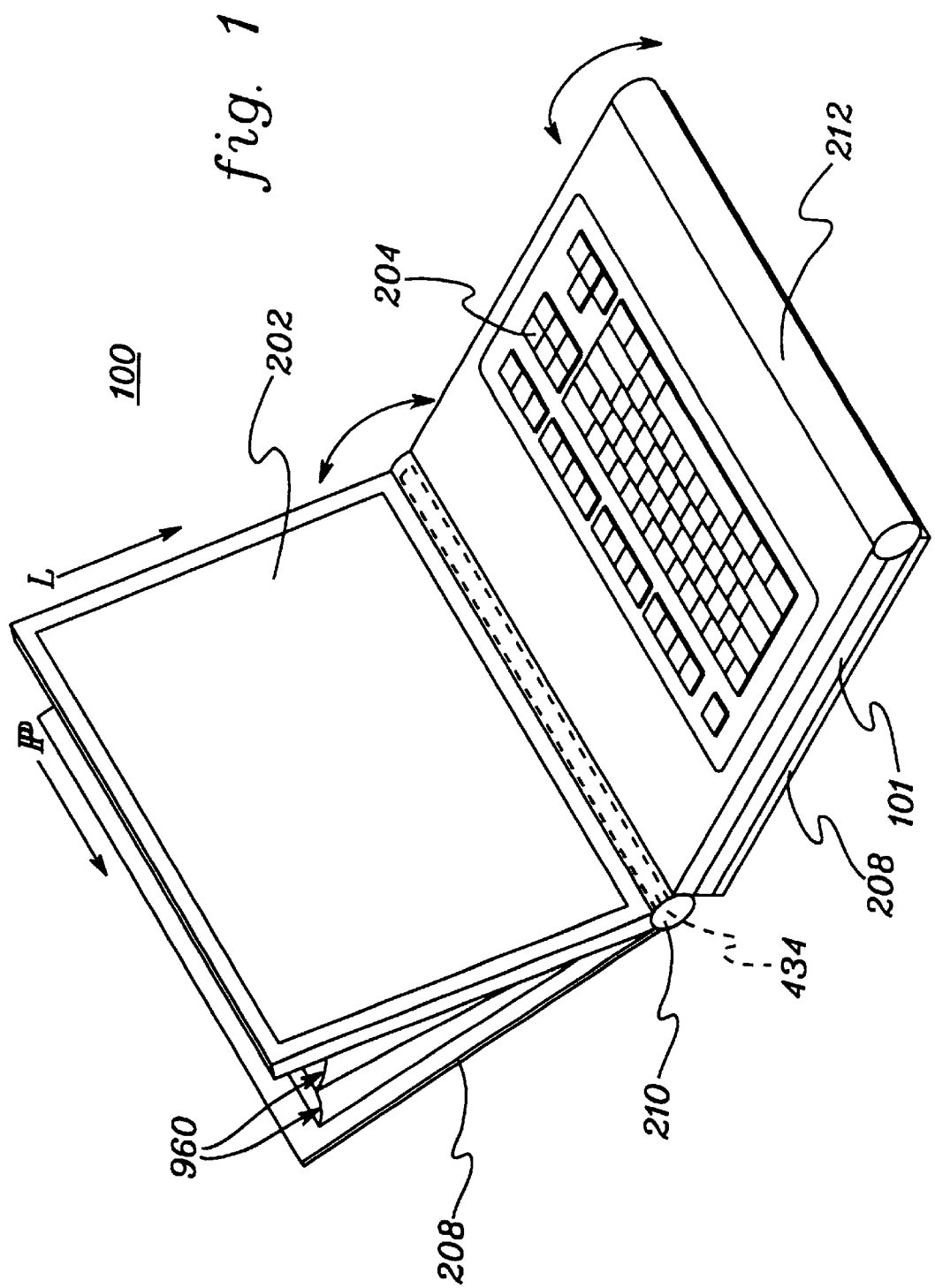
FIG. 1 is a perspective view of a first exemplary embodiment of a computing device incorporating the flexible interfacing and portability capabilities of the present invention, illustrating a display pivotally raised from a keyboard.

In accordance with the principles of the present invention, a flexibly interfaceable, portable computing device is provided in which user interfaces to a processor and/or a display are alternatively, concurrently, or separately available through a keyboard and/or through a recording unit, markable surface, and stylus.

Examples of a flexibly interfaceable, portable computing device incorporating and using the novel features of the present invention are represented in the Figures and described in detail herein.

In a first exemplary embodiment, a flexibly interfaceable, portable computing device 100 (FIGS. 1–4) includes a processor or controller 420 (FIG. 4), a display (e.g., an LCD or a thin film transistor "TFT" active panel or display screen) 202, a (e.g., QWERTY) keyboard 204, a recording unit 101 (FIGS. 1–6), markable surface(s) 150 (FIGS. 2–3 and 5), a stylus 152 (FIGS. 10–11 and 13), a frame or casing 208 (FIGS. 1–3 and 14), and first and second hinges 210 and 212.

A portion of casing 208 may be formed with aluminum or other lightweight, durable material(s). An exterior surface of the casing 208 may include leather, or may have a leathery or leather-like texture such as can be formed through application of a product known in the art as SANTOFRENE. Optionally, the casing might include a number of pouches or pockets 960 (FIG. 1) of any size, type, style, and/or design, such as for holding the stylus 152, documents (not shown), and/or business cards (not shown). Preferably, the casing 208 includes a closing or fastening mechanism 970 (FIG. 14), such as a strap, clasp, snap or zipper.

Figure 2:
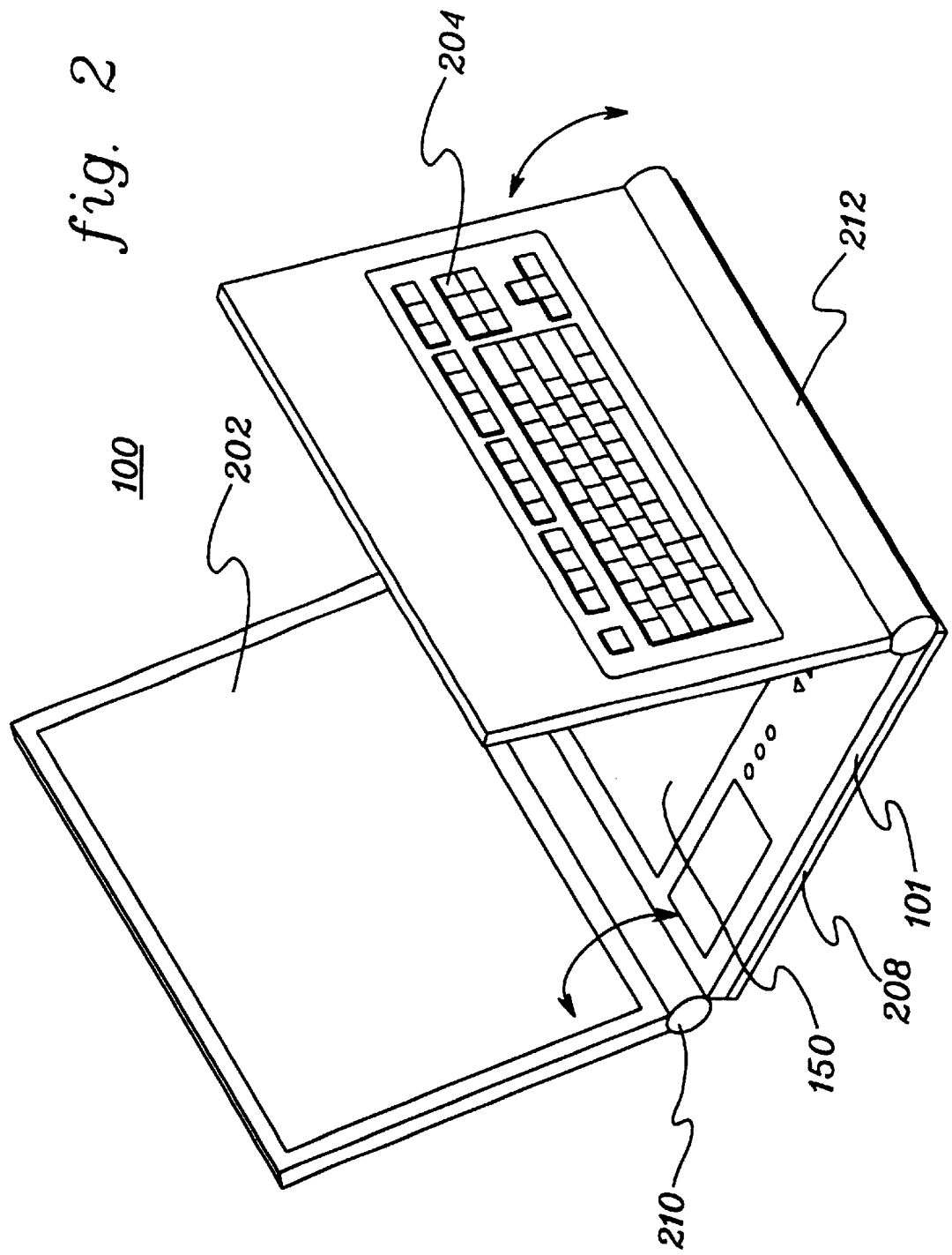
FIG. 2 is a perspective view of the computing device of FIG. 1, further illustrating the keyboard pivotally raised to reveal a recording unit and markable surface.
Figure 3:
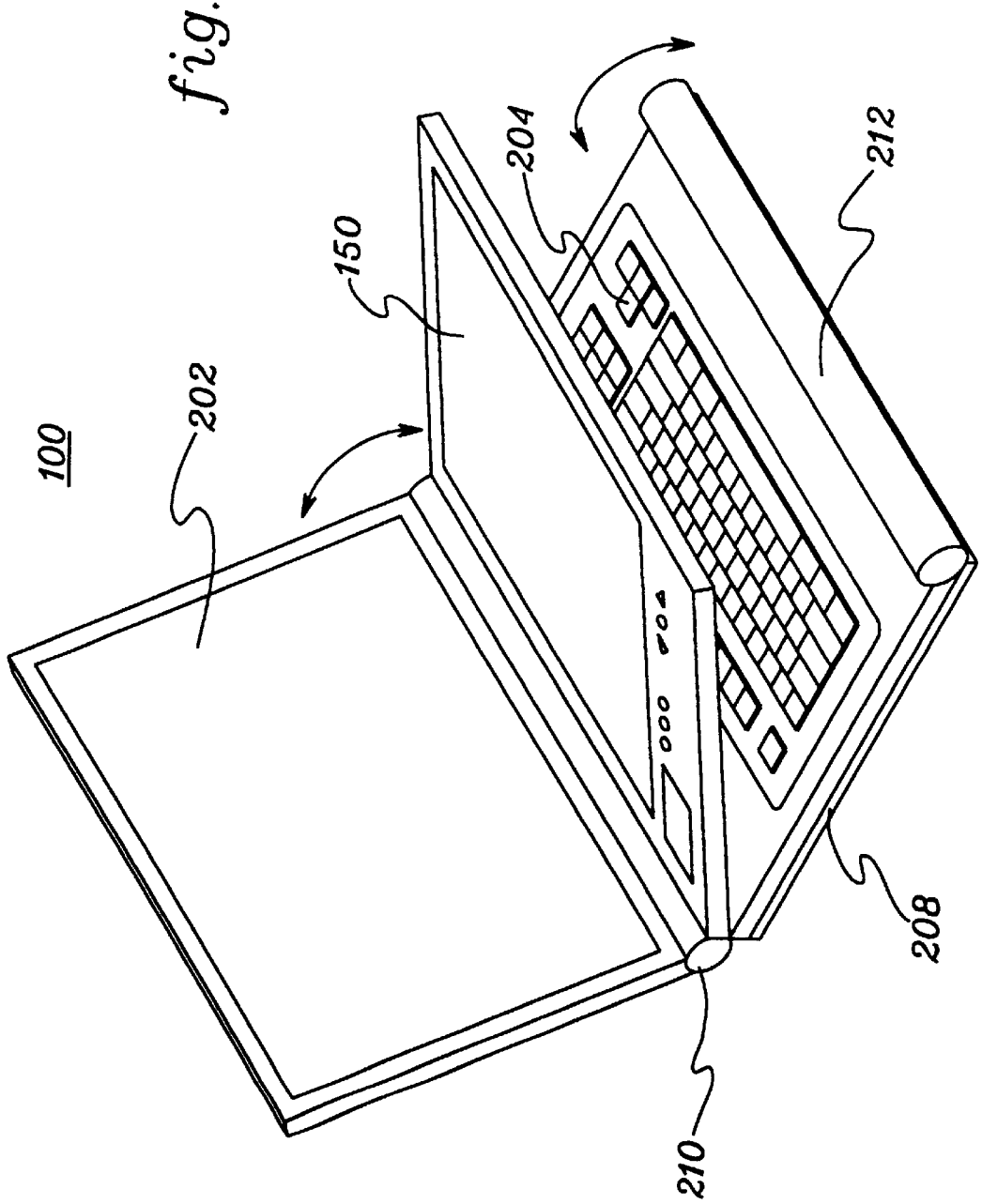
FIG. 3 is a view similar to FIG. 2, illustrating the recording unit and markable surface pivotally raised and the keyboard pivotally lowered.

As depicted in FIGS. 1–3 and described herein, first hinge 210 pivotally interconnects display 202, recording unit 101 (described below), and casing 208. Further, second hinge 212 pivotally interconnects keyboard 204 and the casing 208. Desirably, the hinges 210 and 212 allow a user 154 (FIG. 11) to select a relative positioning of the display, the keyboard, and the recording unit. In particular, the pivoting eases use of the display 202 with either the keyboard or the recording unit, as will be more fully described hereinafter.

Figure 4:
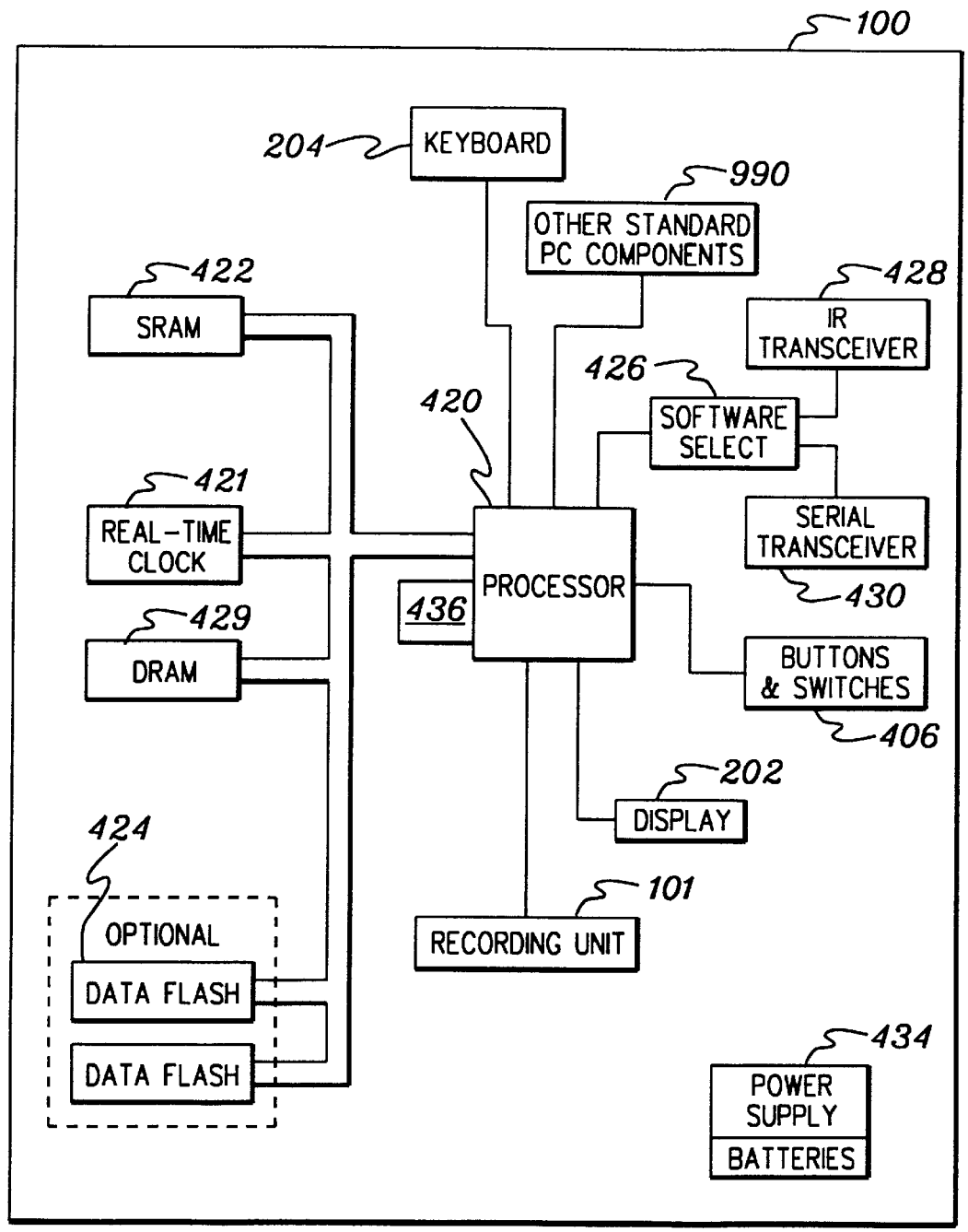
FIG. 4 illustrates a block diagram of one example of components of the computing device of FIG. 1, in accordance with the principles of the present invention.

Referring to FIG. 4, device 100 further includes a number of data storage devices 422, 424, and 429, logic design implementation(s) 436 (discussed further below), a real-time clock 421, software select 426, infrared transceiver 428, serial transceiver (e.g., RS-232, USB, and/or IEEE 1394 serial port) 430, electrical source 434, and buttons or switches 406.

The block diagram of FIG. 4 illustrates one example of the interconnection of components of device 100. In particular, processor 420 is coupled to a real-time clock 421, volatile and nonvolatile memory devices 422, 424, and 429, display 202, and an I/O interface acting through software select 426 and including infrared transceiver 428 and serial transceiver (e.g., RS-232, USB, and/or IEEE 1394 serial port) 430. The processor 420 is coupled to buttons or switches 406, and uses software stored in the memory device(s) for managing operation of the components.

Figure 6:
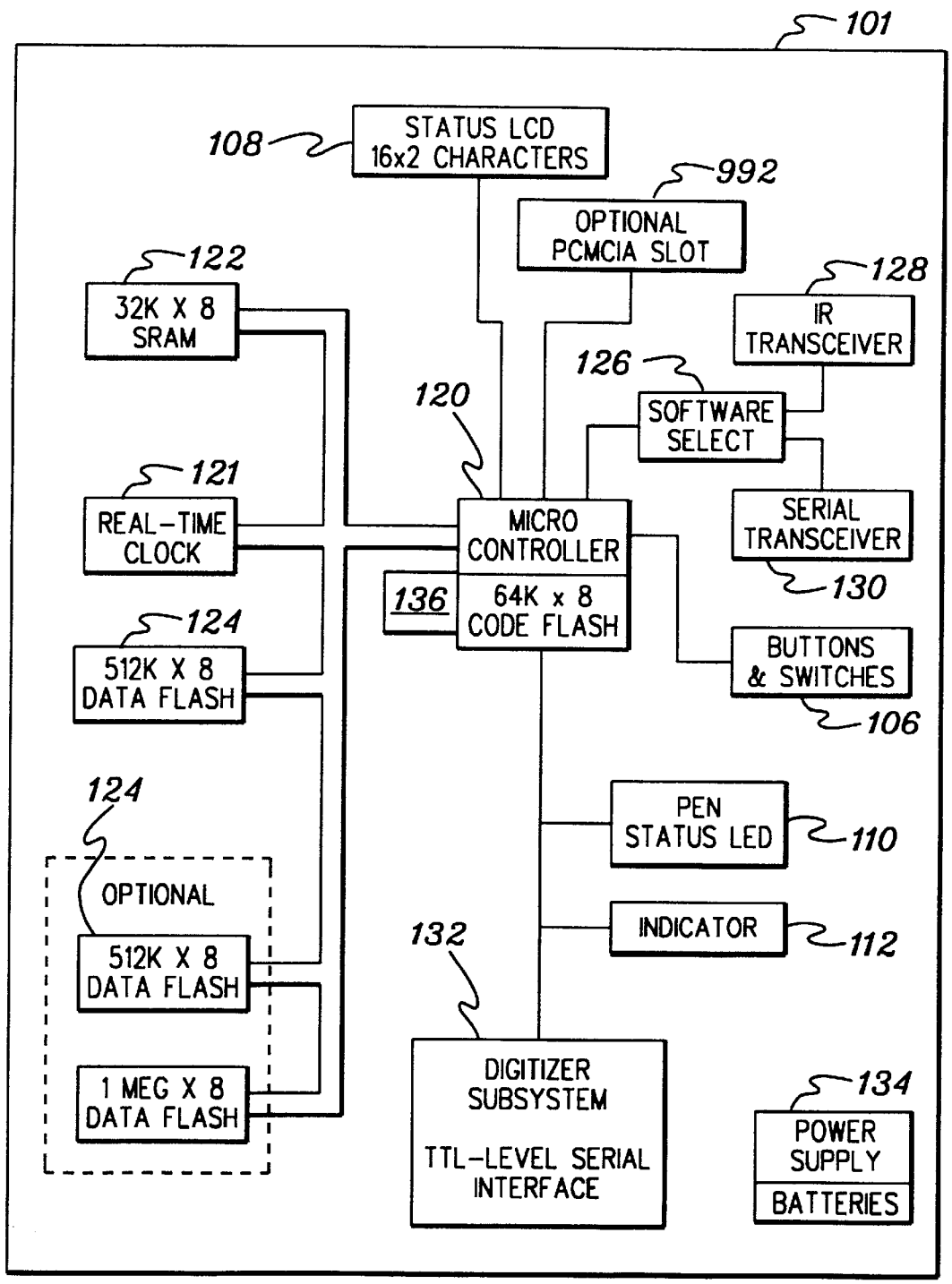
FIG. 6 illustrates a block diagram of one example of components of the recording unit of FIG. 2, in accordance with the principles of the present invention.

Referring to FIGS. 4 and 6, in one aspect, (e.g., communication) link(s) (e.g., port(s) 428, 430, 128, and/or 130), such as for internal and/or external (e.g., system) connection(s), and/or the like, in any appropriate embodiment(s) of the present invention, may include, for example, serial port(s) and/or parallel port(s), and/or may include, for instance, wireless port(s), such as infrared ("IR") port(s) and/or radio-15 frequency ("RF") port(s), and/or may serve to accommodate standard(s) and/or protocol(s) such as RS-232, Universal Serial Bus ("USB"), and/or IEEE 1394. In one example, referring to FIG. 4, keyboard 204 and processor 420 may have a wireless (e.g., RF) link therebetween, where, for instance, communication may occur without a mechanical connection.

Figure 11:
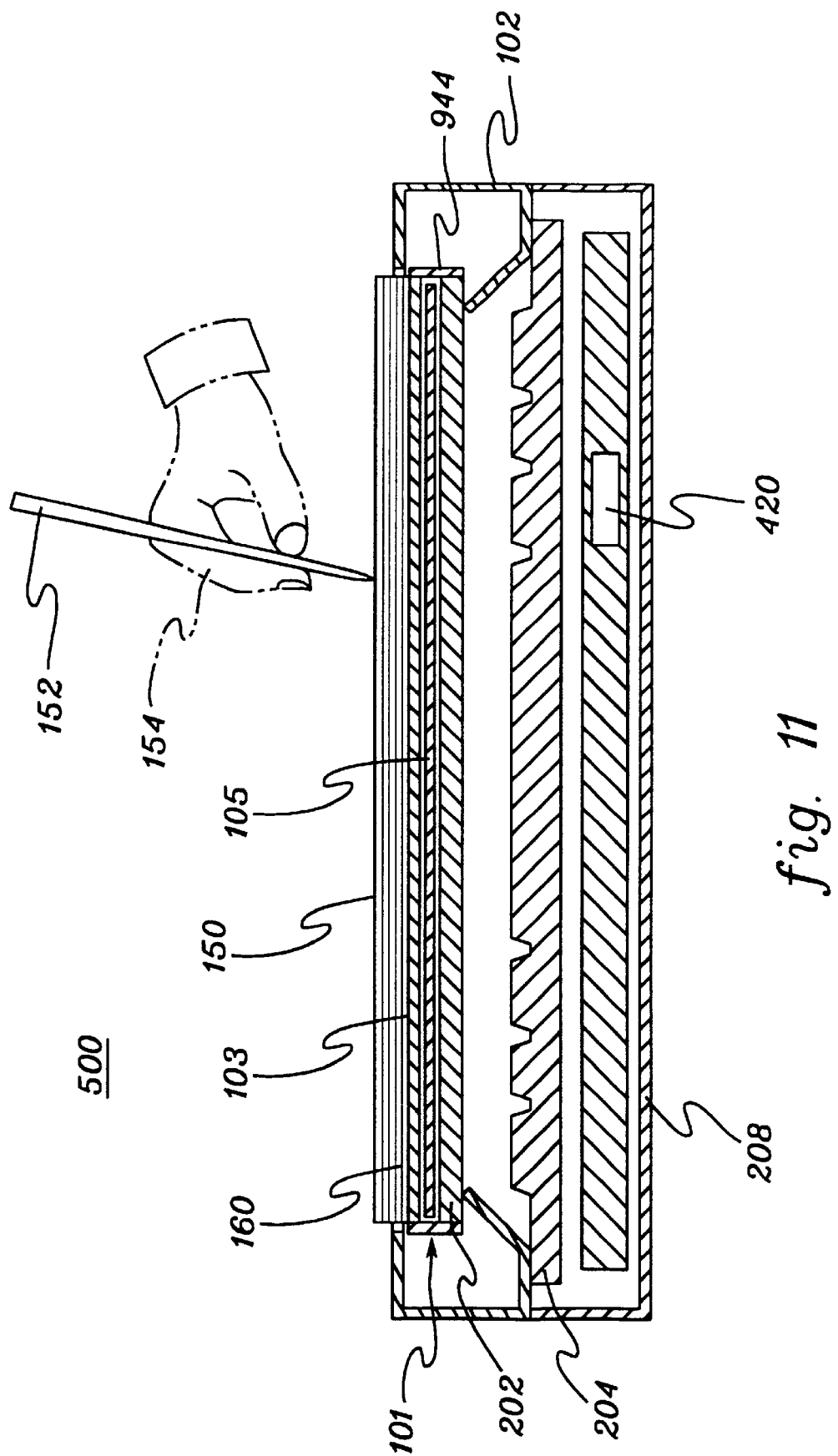
FIG. 11 is a sectional view of the computing device of FIG. 10, directed substantially along line 11—11 thereof.

Still referring to FIG. 4, typically, processor 420 and components associated therewith (e.g., real-time clock 421 and memories 422, 424, and 429) may be located underneath keyboard 204, as illustrated in FIG. 11 with respect to device 500 which is discussed below. Memories 422, 424, and 429 may comprise, for instance, a hard file, a hard disk, a removable storage media, a CD-ROM, a floppy drive, a flash card, a diskette and/or the like. The processor 420 may operate using software such as products manufactured by Microsoft Corporation and sold under the trademarks WINDOWS® 95 and/or WINDOWS® CE. Other standard PC components 990 coupled to processor 420 generally include typical components available in standard laptop or notebook computers.

Figure 7:
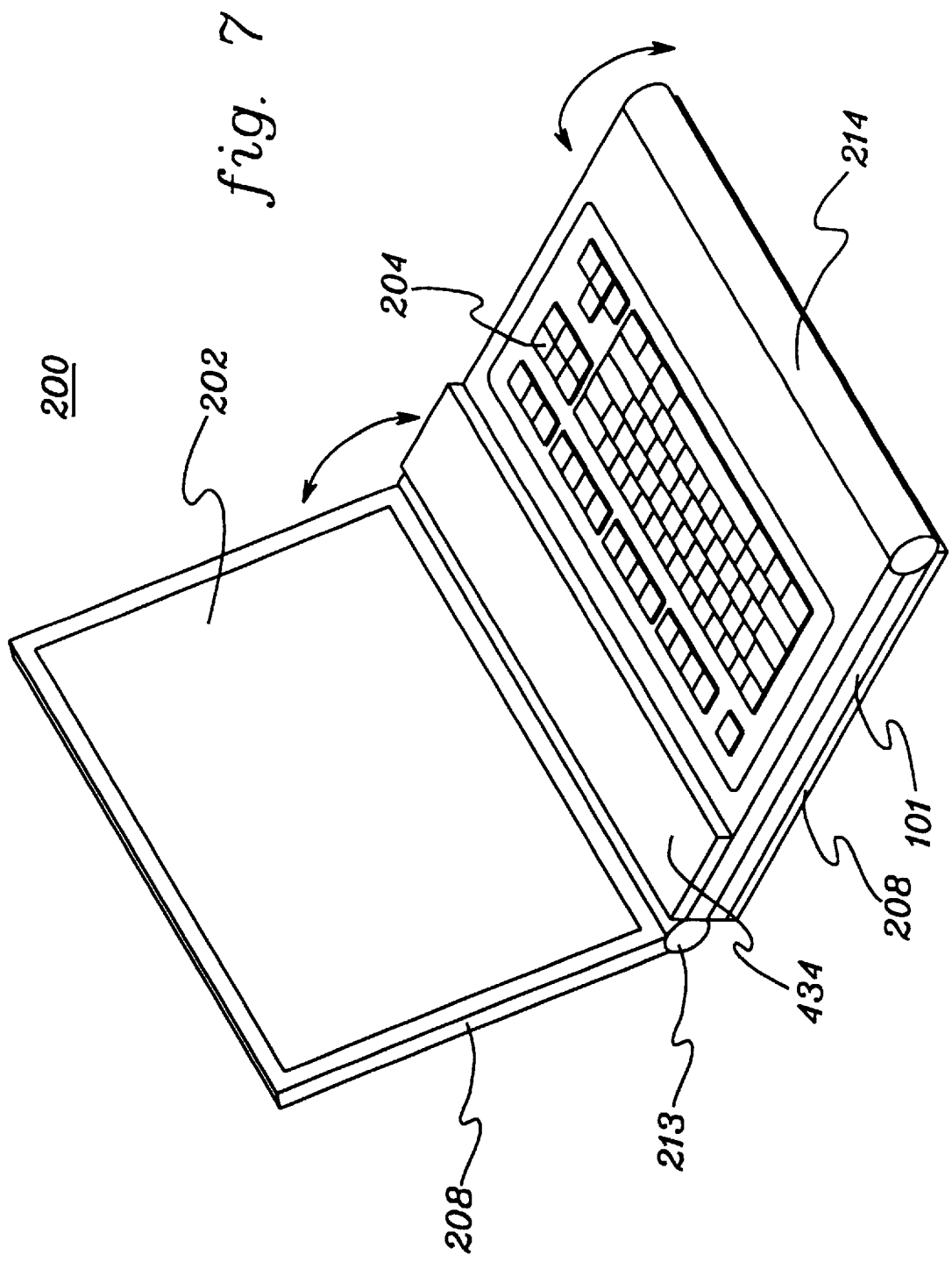
FIG. 7 is a perspective view of a second exemplary embodiment of the computing device of the present invention, illustrating a display pivotally raised from a keyboard.

As depicted in FIG. 1, electrical source 434 may comprise one or more "round" or "cylindrical", batteries 434 housed within first hinge 210. As a second exemplary embodiment of the present invention, FIG. 7 depicts electrical source 434 as comprising one or more "flat" batteries 434 mounted adjacent to the keys of keyboard 204 of flexibly interfaceable, portable computing device 200. Similarly to device 100, the device 200 has a first hinge 213 pivotally interconnecting display 202, recording unit 101, and casing 208. Further, second hinge 214 pivotally interconnects the keyboard 204 and the casing 208.

Figure 5:
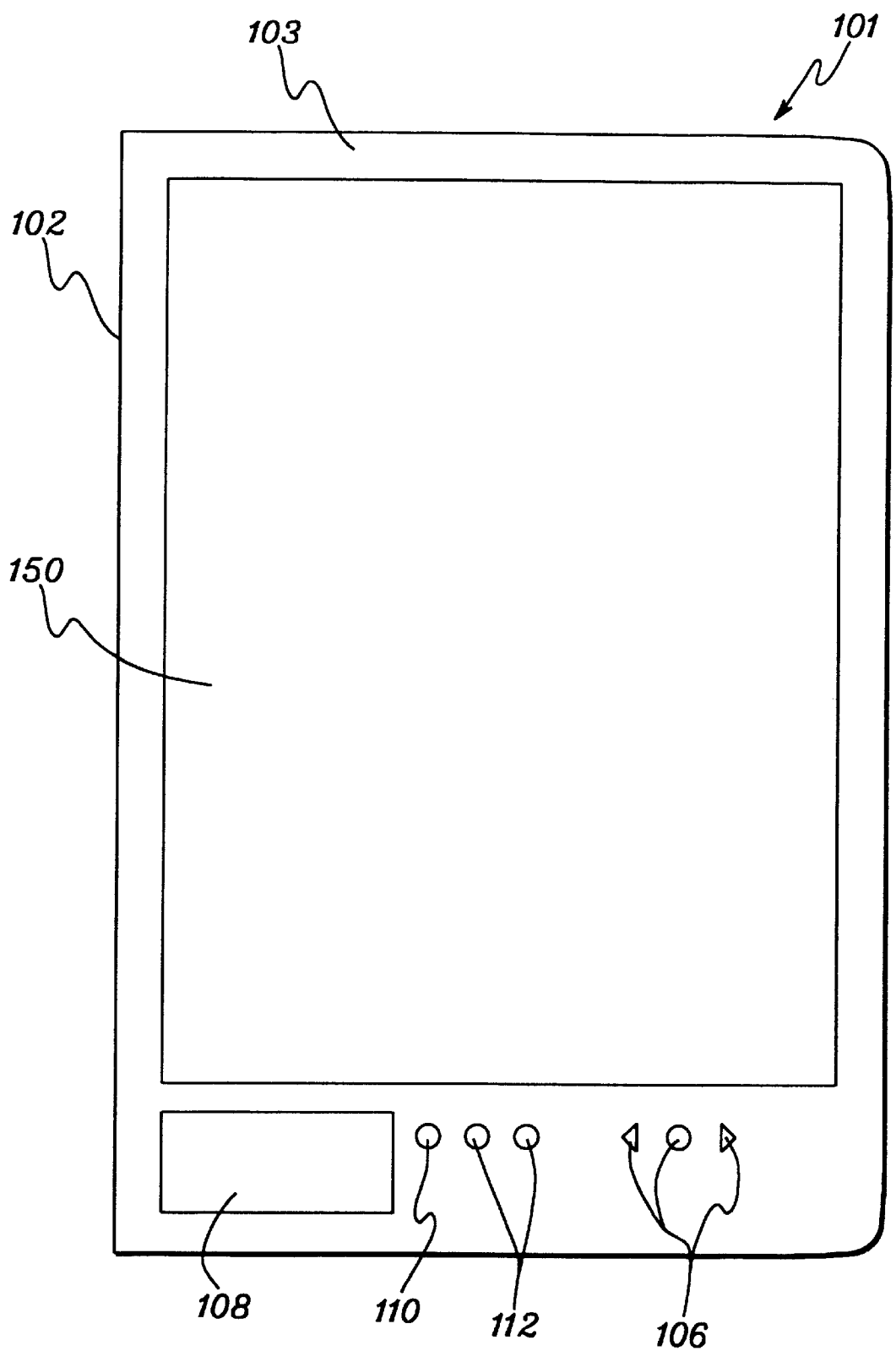
FIG. 5 is a top plan view of the recording unit and markable surface of FIG. 2.

A description of certain features of recording unit 101 will now be presented. As depicted in FIG. 5, recording unit 101 includes a working surface 103. Markable surface 150 is superimposed over the working surface 103. In one example, the markable surface might be laid atop the working surface. In another example, the markable surface might be a top sheet, or an intermediate sheet, of a number of sheets (e.g., a pad) 160 (FIG. 11) of paper positioned in a stack extending outwardly from the working surface. Furthermore, the recording unit might have any desired orientation. Moreover, the markable surface(s) might be laid and/or held on, and/or fastened and/or attached to, the working surface.

Referring to FIGS. 5–6, recording unit 101 includes housing 102, digitizing tablet or digitizer 105 (FIG. 11), a number of (e.g., "soft") buttons or switches 106, display (e.g., an LCD) 108, a number of indicators 110 and/or 112, a processor or microcontroller 120, a number of data storage devices 122 and 124, logic design implementation(s) 136, a real-time clock 121, software select 126, infrared transceiver 128, serial transceiver (e.g., RS-232, USB, and/or IEEE 1394 serial port) 130, and electrical source 134. Furthermore, the microcontroller 120 is coupled to digitizer subsystem 132. Optionally, PCMCIA slot 992 may be coupled to processor 120, and used to attach peripheral devices such as a modem and/or additional memory.

FIG. 6 illustrates a block diagram of one example of the interconnection of electronic components of recording unit 101. In particular, processor or microcontroller 120 is coupled to a real-time clock 121, volatile and nonvolatile memory devices 122 and 124, display 108, indicators 110 and 112, and an I/O interface acting through software select 126 and including infrared transceiver 128 and serial transceiver (e.g., RS-232, USB, and/or IEEE 1394 serial port) 130. Furthermore, the microcontroller 120 is coupled to digitizer subsystem 132 including a digitizing chip set and an electromagnetic sensor. The microcontroller 120 uses software stored in the memory device(s) for managing operation of the components such that a data stream is generated by digitizer 105, in response to strokes produced by the inking stylus 152, for processing, synchronization, and/or recordation. A description of operation of these components is presented herein, with further details provided in the above-incorporated Application 08/747,735.

Although the number, type, layout and interconnection of the components of recording unit 101 might vary from that illustrated in FIG. 6, a preferred example of an indicator 110 is a "pen-down" LED 110, which illuminates during periods of contact or engagement between stylus 152 (FIGS. 10–11 and 13) and a markable surface 150. The markable surface might include a sheet or a pad 160 (FIG. 11) of paper which is superimposed or engagingly positioned on working surface 103 of the recording unit. In order to allow the recording unit to be made relatively thin, electrical source 134 preferably comprises prismatic batteries. In particular, prismatic batteries are formed by a known battery technology which allows batteries to be made relatively flat, thereby allowing the profile of the recording unit to be desirably reduced. This serves to enhance portability and profile slimness for device 100, upon complete enfolding in casing 208 thereof, as depicted in FIG. 14 with respect to device 600 which is discussed below.

Referring to FIGS. 4 and 6, in one aspect, various component(s) (e.g., electrical source 134) for recording unit 101 and various component(s) (e.g., electrical source 434) for device 100 may have any number of interrelationship(s) and/or integration(s), such as for purpose(s) of flexibility and/or conservation. In one example, the recording unit could have its own electrical source 134. In another example, electrical source 434 could comprise the electrical source 134, and/or vice versa (e.g., such as where the electrical source 434, and/or the electrical source 134, service the recording unit as well as other component(s) of the device 100). In yet another example, the electrical source(s) 434 and/or 134 could be located in a spine and/or a hinge for the device.

Still referring to FIGS. 4 and 6, in a further aspect, (de)coupling and/or (dis)connectability among various components may be optional in certain embodiment(s) of the present invention. Also, where electrical source 434 services recording unit 101, processors 420 and 120 need not necessarily be turned on and off together; that is, they may be independently controlled. In one example, the recording unit may be physically separated from device 100 (e.g., at a hinge), with, for instance, a cable remaining as a (e.g., USB) link between processor 120 and electrical source 434 and/or processor 420. Furthermore, such a (e.g., USB) link may allow the recording unit to be detached and decoupled from device 100, such as for independent operation(s). Moreover, the link may allow an electrical source distinct from the recording unit and the device to service the recording unit, as will be understood by those skilled in the art.

Further explanation of the construction and operation of recording unit 101 and stylus 152 (FIGS. 10–11 and 13) will now be presented. Digitizer 105 (FIG. 11) preferably includes an active area capable of receiving a number of electromagnetic signals (e.g., a number of radio frequencies), for instance, from pen or stylus 152. The digitizer might monitor signal(s) using a radio-sensitive grid. Preferably, recording unit 101 can distinguish among "pen-down," "pen-up in-proximity," and "pen-up out-of-proximity" locations, conditions, and/or states of the stylus, as discussed in the above-incorporated Application 08/747, 735. The digitizer can be formed such that a portion of the active area is sized to accommodate, for example, 8.5 in. by 11 in. paper, A4 paper, and/or any standard or non-standard size and/or shape of paper, including any number, configuration, and/or variety of sheets. In addition, display 108 can provide prompts for, and/or communicate information to, a user 154.

With regard to working surface 103 (FIG. 5), a button 106 might be a "soft button" formed as an area of working surface 103 which superimposes digitizer 105. For example, a button 106 might be an area which is predefined to transmit to recording unit 101 a specific input when a stimulus is detected at the button. That is, a soft button might correspond to an area of the digitizer which is predefined to indicate a specific input value when stroke information is detected, for example, over that area. This general type of soft button is disclosed in the above-incorporated Application 08/747,735. Furthermore, button(s) 106 might have any location(s) or position(s) on, or in, the recording unit. For instance, the configuration of button(s) might be designated by default or through a customization procedure. Optionally, a legend might accompany a given button 106 for an indication of a function thereof.

Preferably, electronic, inking stylus 152 (FIGS. 10–11 and 13) includes electronic (e.g., integrated) circuitry, a battery, and an ink cartridge, and emits, or resonates at, a first radio frequency. For purposes of this discussion, this first radio frequency might serve as a "tracking" signal or a "pen-up in-proximity" signal. In one embodiment, digitizer 105 emits a field (at a particular frequency) toward the core of the stylus. The stylus can be formed to resonate in that field (at that frequency). Thus, the stylus might supply the tracking signal to the recording unit simply by being close enough to recording unit 101, without powering any of its own electronics.

Furthermore, stylus 152 preferably includes a switch or a pressure sensor (not shown) for generating a second radio frequency (e.g., a different signal and/or an additional signal) when the tip of the stylus is engaged, such as by being contacted with, or pressed upon, a surface. This second radio frequency might serve as a "touching" signal or a "pen-down" signal conveyed to digitizer 105. For instance, the "pen-down" signal might be substituted for the above-described "pen-up in-proximity" signal, or transmitted in addition thereto. Optionally, the "pen-down" signal might be transmitted through a dedicated line (not shown).

Moreover, the tip of stylus 152 has physical inking capabilities. For example, the "pen-down" signal might be activated by writing of text and/or marks 946 (FIG. 10) upon markable surface 150, superimposed with respect to digitizer 105. Furthermore, the "pen-up in-proximity" signal might be activated merely by hovering of the stylus with respect to recording unit 101, such as by hovering of the stylus over paper 150 placed atop the digitizer. Moreover, the "pen-down" and "pen-up in-proximity" signals might be sensed by the recording unit notwithstanding lack of direct physical touching, such as when user 154 maneuvers the stylus over and/or upon a sheet or layer of paper which is separated from working surface 103 by a number of other sheets or layers (e.g., pad 160) of paper and/or item(s).

Digitizer 105 generates a data stream (e.g., "stroke" data) representing the strokes of stylus 152, operated by user 154. The "stroke" data might comprise text and/or any number of marks, lines, and/or shapes 946 (FIG. 10) written on, or in proximity to, working surface 103 of recording unit 101. For instance, digitizer 105 might generate the "stroke" data by monitoring and/or sampling the "pen-up in-proximity" signal and/or the "pen-down" signal across a receiver such as radio-sensitive grid (not shown). As described above, a physical inking capability of the tip of the stylus preferably further allows formation of physical marks 946 on, for example, paper 150 which is superimposed over the working surface.

Recording unit 101 thus serves to generate and record a data stream representing handwritten text. A user 154 might use the recording unit in conjunction with a number of sheets of paper 150 simply by placing and/or clipping the paper against working surface 103 of the recording unit. As illustrated by markings 946 in FIG. 10, strokes physically inked on the paper by stylus 152 can be electronically represented in a data stream generated by the recording unit. For example, the data stream might be recorded while handwritten strokes are received, thereby creating an electronic record of handwritten notes 946.

Data recordation is generally accomplished through detection of strokes and "events." For example, an event might be an occurrence which is assigned a predefined meaning. A variety of events might be defined in order to facilitate recording and/or processing of a data stream.

In particular, events might be categorized as automatically generated by recording unit 101 or as invoked by user 154, as discussed in the above-incorporated Application 08/747, 735. Namely, automatically generated events might occur and be detected and/or recorded without specific input from the user. When a predefined event (e.g., a pen-up in-proximity event) is detected, a unique data string identifying the event might be recorded. The recording unit 101 might then record a time and date stamp indicative of the time and date at which the event occurred. This recording of a time and date stamp in association with each event might facilitate later processing and/or synchronization (described below) of stroke and event data.

Examples of user invocations of events include a "new page" event (e.g., used to identify the particular page of a writing medium upon which subsequent strokes will be made) and a "stroke characterization" event (e.g., used to indicate that certain strokes share a common characteristic, and/or used to label previously recorded data as being of a specific type). Further, the user might use soft button(s) 106, discussed above, and/or "bounding strokes" for invocation of events. That is, events, such as an invocation of switches or soft button(s) 106, might be defined to have certain meanings.

In a preferred embodiment, a pen-down event is defined which indicates that stylus 152 has been brought into contact with, for instance, markable surface 150. Also, there might be defined a pen-up event which indicates that the stylus has been lifted from, for example, the markable surface. Furthermore, recording unit 101 might provide additional information regarding a stylus which is not touching the markable surface, namely, whether the stylus is in proximity (a "pen-up in-proximity" event) or out of proximity (a "pen-up out-of-proximity" event).

As will be appreciated by those skilled in the art, design choices might allow numerous variations, settable by user 154 and/or a manufacturer, retailer, and/or servicing entity.

In accordance with the principles of the present invention, device 100 further includes logic design implementation(s) 436 (FIG. 4) coupled to processor 420. Moreover, recording unit 101 further includes logic design implementation(s) 136 (FIG. 6) coupled to microcontroller 120. These measures facilitate operation of the device 100 and synchronization (described herein) of information therefor. As will be appreciated by those skilled in the art, the design implementations 436 and 136 might include software (e.g., code instructions and/or statements) and/or hardware (e.g., gates and/or devices). For instance, the logic might include finite-state machines, Boolean algebra, and/or "fuzzy" logic. Also, the logic design might include digital logic, machine language (s), assembly language(s), and/or high-level languages (e.g., C, FORTRAN, and/or LISP), including those suited for object orientation (e.g., C++ and/or "JAVA").

Returning to FIGS. 1–3, further description of use and operation of device 100 will now be presented. As represented in FIG. 1, the device 100 can be used in a typical laptop or notebook computer orientation or configuration.

For instance, a user 154 might sit with casing 208 supported upon his or her lap (or a table or desk 2280 as depicted in FIGS. 22–31), such that the user can type at keyboard 204 and view display 202. Furthermore, as depicted in FIG. 2, the user can pivotally raise the keyboard (pivotally connected at second hinge 212) to uncover recording unit 101. In addition, with the keyboard still lifted, the user can pivotally lift the recording unit (pivotally connected at first hinge 210). As depicted in FIG. 3, the user can then pivotally lower the keyboard, with the recording unit lifted. Next, the user can pivotally lower the recording unit over the keyboard, for easy use of the recording unit, in accordance with the principles of the present invention. Desirably, user 154 can select to use the keyboard and/or the recording unit in conjunction with the display 202, as discussed herein.

In addition, a user 154 can advantageously choose to use keyboard 204, for instance, after having used recording unit 101. Namely, the user could pivotally lift the recording unit connected at first hinge 210, pivotally raise the keyboard connected at second hinge 212 opposite to the first hinge, pivotally lower the recording unit, and finally pivotally lower the keyboard. Such a sequence is illustrated by examination, in the following order, of FIG. 3, FIG. 2, and FIG. 1.

First and second hinges 210 and 212 serve to allow display 202 and keyboard 204 to be folded in casing 208, and the overall device to be slim and portable, such as is illustrated in FIG. 14 with respect to device 600 (discussed below). Also, for purposes of enhancing user viewing, display 202 can optionally include a collapsible stand or brace (e.g., support arm 2464 depicted in FIG. 24) on its backside for partial, total, or auxiliary support thereof.

Device 100 is preferably configured so recording unit 101 can rest upon an exterior part of second hinge 212, to prevent the recording unit from resting upon keys of keyboard 204 when positioned thereabove. Furthermore, side rails or bars (not shown) about, or adjacent to, the keyboard can protect its keys from contact with the recording unit by providing support therefor. Alternatively, such side rail(s) or bar(s) could be (e.g., integrally) formed on the backside of the recording unit. Optionally, retractable leg(s) or support(s) could be positioned on the backside of the recording unit. As will be understood by those skilled in the art, such techniques serve to provide a clearance between the backside of the recording unit and the keys of the keyboard.

Figure 8:
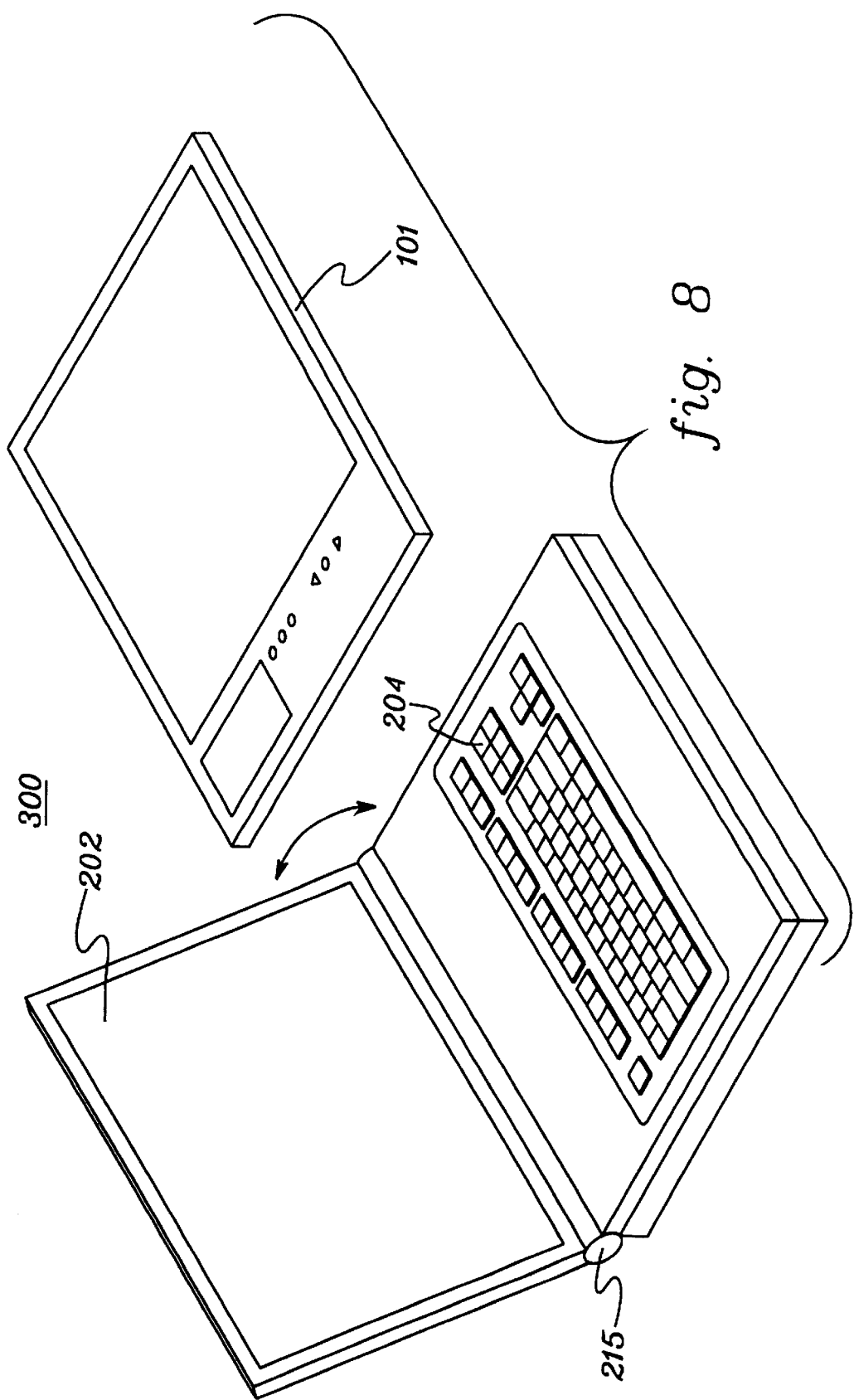
FIG. 8 is a perspective view of a third exemplary embodiment of the computing device of the present invention, illustrating a display pivotally raised from a keyboard, where a recording unit and markable surface are decoupled therefrom.

FIG. 8 depicts a selective connectivity feature of a third exemplary embodiment of the present invention, illustrated as flexibly interfaceable, portable computing device 300. In particular, recording unit 101 can be selectively coupled/attached and/or selectively decoupled/detached from device 300, such as through optical, electrical, wireless, infrared, radio-frequency and/or mechanical port(s), link(s), or connector(s) 428 and/or 430 (FIG. 4) as well as port(s), link(s), or connector(s) 128 and/or 130 (FIG. 6).

A hinge 215 pivotally interconnects display 202 and keyboard 204, thereby allowing user 154 to swing the display 202 open or closed from the keyboard. Alternatively, a first hinge could pivotally interconnect display 202, recording unit 101, and the casing, and a second hinge could pivotally interconnect keyboard 204 and the casing, comparably to hinges 210 and 212 depicted in FIGS. 1–3.

Desirably, user(s) 154 can use the recording unit separately, or concurrently, with a use of keyboard 202 and display 204, as represented in FIG. 8. For example, a user 154 may travel to a conference with device 300. In attending a meeting at the conference, the user may decide to take just recording unit 101, and advantageously decouple the same from the device 300. Any recording unit 101 of the various embodiments of the present invention discussed herein might be formed or configured to be selectively coupled and selectively decoupled from other component(s). With respect to such use(s), synchronization and updating of information, such as between processors 420 and 120, are discussed further below in the description of FIG. 15.

In accordance with the principles of the present invention, any display 202 can operate in viewing modes suited or selected for desired orientations of recording unit 101 and/or keyboard 204. With regard to device 100 (FIGS. 1–3), display 202 may operate in, for example, landscape or portrait modes, as will be discussed now, as well as further below with respect to FIG. 15.

As will be understood by those skilled in the art, in landscape mode, graphics and/or text of display 202 are oriented along the shorter of the two major axes of the display 202 illustrated in FIG. 1. That is, in landscape mode, a direction "from up to down" would be oriented "from top to bottom," ARROW L, of the display 202, comparably to an elevation view. Typically, a user 154 would prefer landscape mode of the display 202 when using keyboard 204. In particular, software applications such as word processors and spreadsheets often are suited for use in landscape mode.

In contrast, when using recording unit 101, a user 154 would usually desire portrait mode of the display 202, where graphics and/or text of the display 202 are oriented along the longer of the two major axes of the display 202 illustrated in FIG. 1. Namely, in portrait mode, a direction "from up to down" would be oriented "from right to left," ARROW P, (or "from left to right") of the display 202, generally referred to as "crosswise." Portrait mode of display 202 advantageously accommodates the usual way a user would write on common, run-of-the-mill lined paper 150.

In a given viewing mode of display 202, processor(s) 420, 120 with respective logic design implementation(s) 436, 136 could provide real-time incorporation of user input (e.g., markings 946 on paper 150 superimposing the recording unit 101, or typing at keyboard 204) into any desired graphics and/or text. For instance, a user 154 may draw on markable surface 150 with corresponding electronic imagery appearing on display 202, for desirable interactivity. Further, any other or independent information (e.g., stored in memory) could be provided on the display 202 as aid, assistance, or reference to the user or operator of the recording unit 101 or the keyboard 204.

Preferably, logic design implementation(s) 436, 136 allow switching between or among viewing modes, as discussed below in regard to FIG. 15. In one example, switching to landscape mode occurs automatically when keyboard 204 is active, and switching to portrait mode occurs automatically (with optional explicit user overriding) when recording unit 101 is active and connected or attached to device 100. Such automatic switching may occur through activation of a pin, as will be understood by those skilled in the art. In another example, user 154 may explicitly select between viewing modes, such as by operating button(s) 406 (FIG. 4), button(s) 106 (FIGS. 5–6), and/or keys of keyboard 204.

Figure 15:
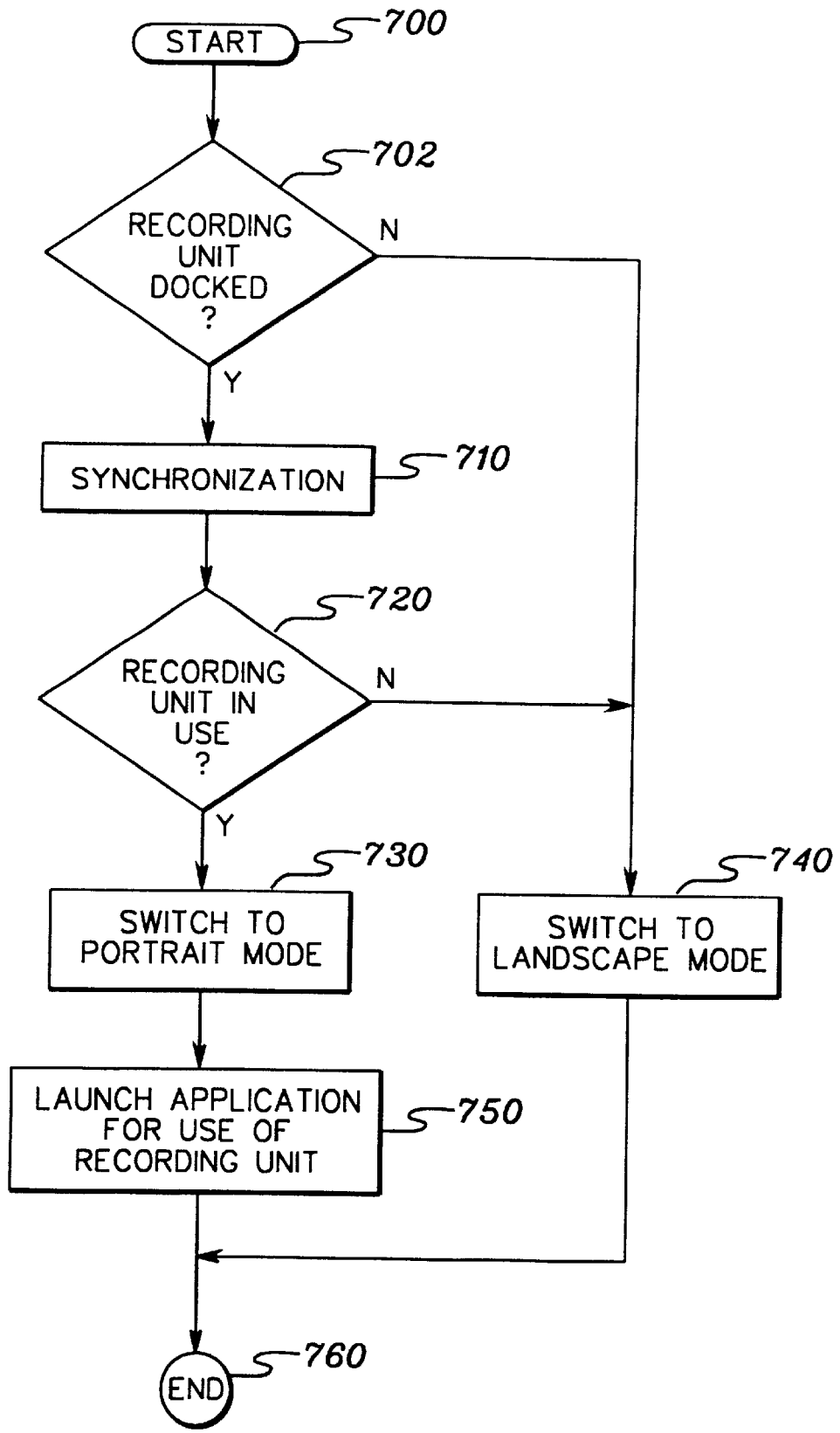
FIG. 15 depicts one embodiment of the logic used by the computing device of the present invention to accomplish synchronization of information as well as switching between landscape and portrait modes.

In accordance with the present invention, FIG. 15 represents exemplary logic used to accomplish synchronization of information as well as switching between landscape and portrait modes. In a preferred embodiment, the logic is part of a loop implemented using logic design implementation 436, preferably in conjunction with logic design implementation 136, as will be understood by those skilled in the art.

For example, a loop can start at STEP 700. The loop may serve to evaluate and respond to statuses, states, or conditions of, or with respect to, the recording unit 101.

After the loop has started at STEP 700, INQUIRY 702 determines whether recording unit 101 is docked. For example, this determination can be made on the basis of optical, electrical, wireless, infrared, radio-frequency and/or mechanical connection of ports 428, 430 and 128, 130, possibly in conjunction with sensors (not shown) and/or logic design implementations 436 and 136. In an alternative embodiment, INQUIRY 702 could determine whether keyboard 202 is not exposed, as discussed herein.

A negative determination at INQUIRY 702 results in a switch to landscape mode for display 202, at STEP 740. Namely, it has been determined that recording unit 101 is not being used with the display 202. Furthermore, it is presumed that keyboard 204 is to be used with the display 202. Therefore, as discussed above, landscape mode is the appropriate viewing mode, STEP 740.

The above-described INQUIRY 702 is suitable for use with device 100 as depicted in FIG. 1. In an alternative configuration which will be understood by those skilled in the art, a negative determination at INQUIRY 702 might instead positively indicate that the keyboard is in fact in use with the display 202, so landscape mode would be appropriate, STEP 740. This alternative formation of INQUIRY 702 is suitable for use with device 400 (FIG. 9), discussed below.

After STEP 740 of FIG. 15, the loop ends at STEP 760 with a possibility of continued looping, for example, through STEP 700 and INQUIRY 702. For instance, this loop might cycle throughout active operation of a flexibly interfaceable, portable computing device formed in accordance with the present invention. Optionally, a user 154 might select whether the loop is to be activated. Further, the user might override default viewing modes, and/or provide supplemental or additional viewing mode(s), as will be appreciated by those skilled in the art.

Returning to INQUIRY 702, a positive determination thereat leads to synchronization, STEP 710, of information between processors 420 and 120 and associated memories 422, 424, 429 and 122, 124. As described above in regard to FIG. 8, a user 154 may advantageously operate recording unit 101 in a selectively decoupled status, state, or condition. For instance, the user may mark notes 946 for storage in the independent recording unit during attendance at a presentation. Following such separate use, the user can simply reconnect the recording unit for re-coupling of processors 420 and 120, to advantageously synchronize information therebetween. That is, any information newly input into recording unit 101 as a stand-alone unit can be updated and reconciled with any information previously available to the processor 420, and vice versa.

In one example, a decoupled recording unit 101 electronically receives new information. Upon re-coupling, processor 420 reads from the recording unit the new information. Time and date stamping can assist in the synchronization. For instance, information can be classified as new if the information has been input or modified later than the occurrence of the last synchronization. That is, the time and date may be written into a data stream on the recording unit at successful completion of each data transfer. In particular, the processor 420 may send an acknowledgement to processor 120 after successful receipt of the information. In another example, a user 154 or other entity may configure the recording unit 101 to transfer only information which has been input since the last data transfer to processor 420.

In yet another aspect of the invention, a user 154 could link the processor 420 to a server or network, with recording unit 101 coupled or decoupled, for synchronization with a database, as will be appreciated by those skilled in the art. Similarly, processor 120 may be coupled to a server or network, where coupling of recording unit 101 to processor 420 results in synchronization of information, in accordance with the present invention. The server or network might be accessible by other users, for example, peers, customers, overseers and/or administrative assistants. Furthermore, the other user(s) may have differing level(s) of access. Also, any of a variety of priority, updating, verification and/or conflict resolution schemes might be employed.

Following synchronization at STEP 710, INQUIRY 720 determines whether recording unit 101 is in use. A determination of non-use of the recording unit results in a switch to landscape mode for display 202, at STEP 740, with the presumption that keyboard 204 is to be used with the display 202. Further, should INQUIRY 720 determine that the recording unit is indeed in use, then STEP 730 makes a switch to portrait mode for display 202. As discussed above, portrait mode is an appropriate default viewing mode for use of the display 202 in conjunction with the recording unit. A given user, servicer, or manufacturer could alter, modify, or supplement these exemplary viewing modes, as will be understood by those skilled in the art.

After STEP 730, an (e.g., graphics or calendar) application is launched at STEP 750 for use of recording unit 101. This is a natural extension of the determination already made in reaching STEP 750, namely, at INQUIRY 720 it was determined that the recording unit is in use. Finally, looping may continue through STEP 760, as discussed above.

With respect to STEP 750, the launched application is to be used in conjunction with recording unit 101. Further, the application is not required for the recording unit to be used, for example, separately from display 202.

Figure 9:
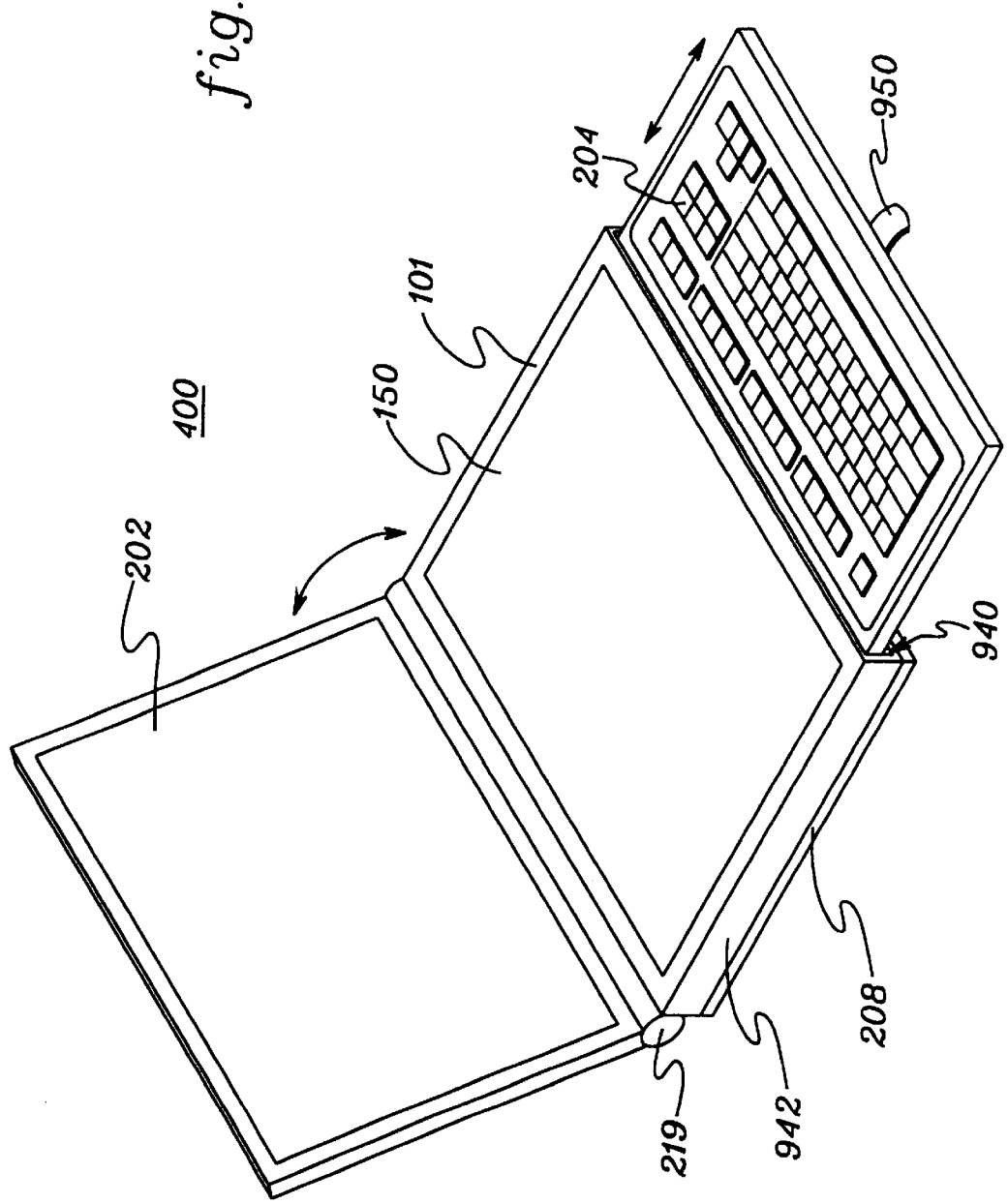
FIG. 9 is a perspective view of a fourth exemplary embodiment of the computing device of the present invention, illustrating a display pivotally raised from a recording unit and markable surface, where a keyboard is partially removed from a slot therebelow.

As depicted in FIG. 9, a fourth exemplary embodiment of a flexibly interfaceable, portable computing device 400 has a hinge 219 which pivotally interconnects display 202 and recording unit 101. Keyboard 204 is stored in a slot 940 formed in a structural support 942 for the recording unit. Thus, a user 154 may switch from using the recording unit to using the keyboard by removing the keyboard from the slot, and positioning the keyboard over the recording unit, and optionally over markable surface 150. The keyboard has a tongue or handle 950 attached to the keyboard to ease or facilitate removal of the same from the slot. As will be appreciated by those skilled in the art, an optical or infrared link 428 (FIG. 4) may be mounted at the hinge 219 for communicating with an optical or infrared link 128 (FIG. 6) mounted at an exterior rearward wall of the keyboard, when positioned atop the recording unit and/or the markable surface. Alternatively, links 428 and 128 may comprise pin connections.

Also, user 154 can lift and remove keyboard 204 from recording unit 101 and/or markable surface 150, for use of the same. In addition, the user can slide the keyboard into slot 940, and pivotally lower display 202 so device 400 achieves a slim, portable profile such as is depicted in FIG. 14 and discussed herein.

Figure 10:
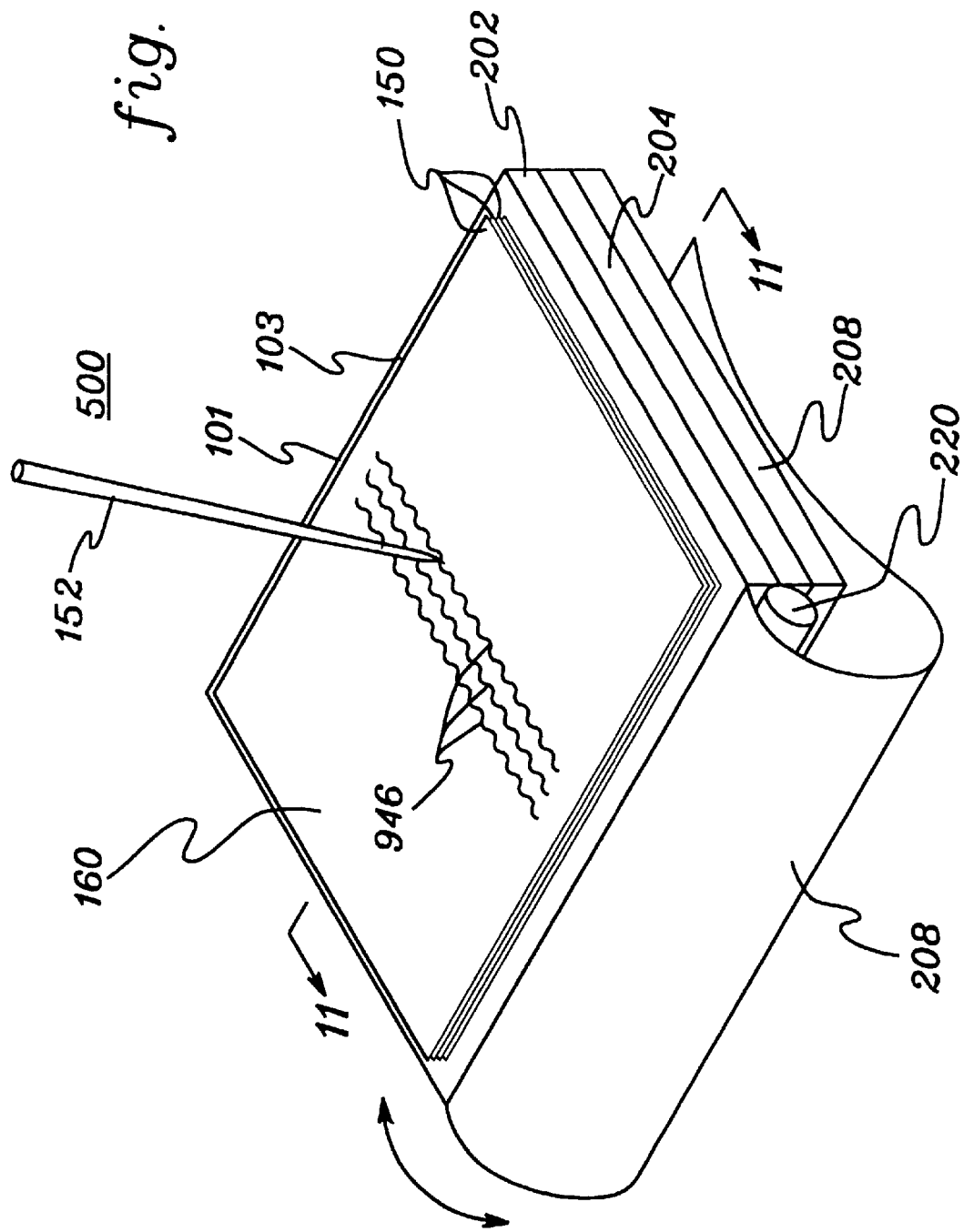
FIG. 10 is a perspective view of a fifth exemplary embodiment of the computing device of the present invention including a stylus, illustrating a recording unit located on the backside of a display.

In a fifth exemplary embodiment, a flexibly interfaceable, portable computing device 500 (FIGS. 10–12) has recording unit 101 mounted at the backside of display 202. Namely, as depicted in FIG. 11, digitizer 105 is enclosed or encased within the recording unit such that the recording unit and the display 202 share a structural member 944. Furthermore, working surface 103 faces outwardly from the backside of the display 202. So, as illustrated in FIG. 10, pad 160 of paper sheets 150 would superimpose the working surface of the recording unit, allowing a user 154 to employ stylus 152 to mark upon the paper while the display 202 is folded or closed toward keyboard 204.

Figure 12:
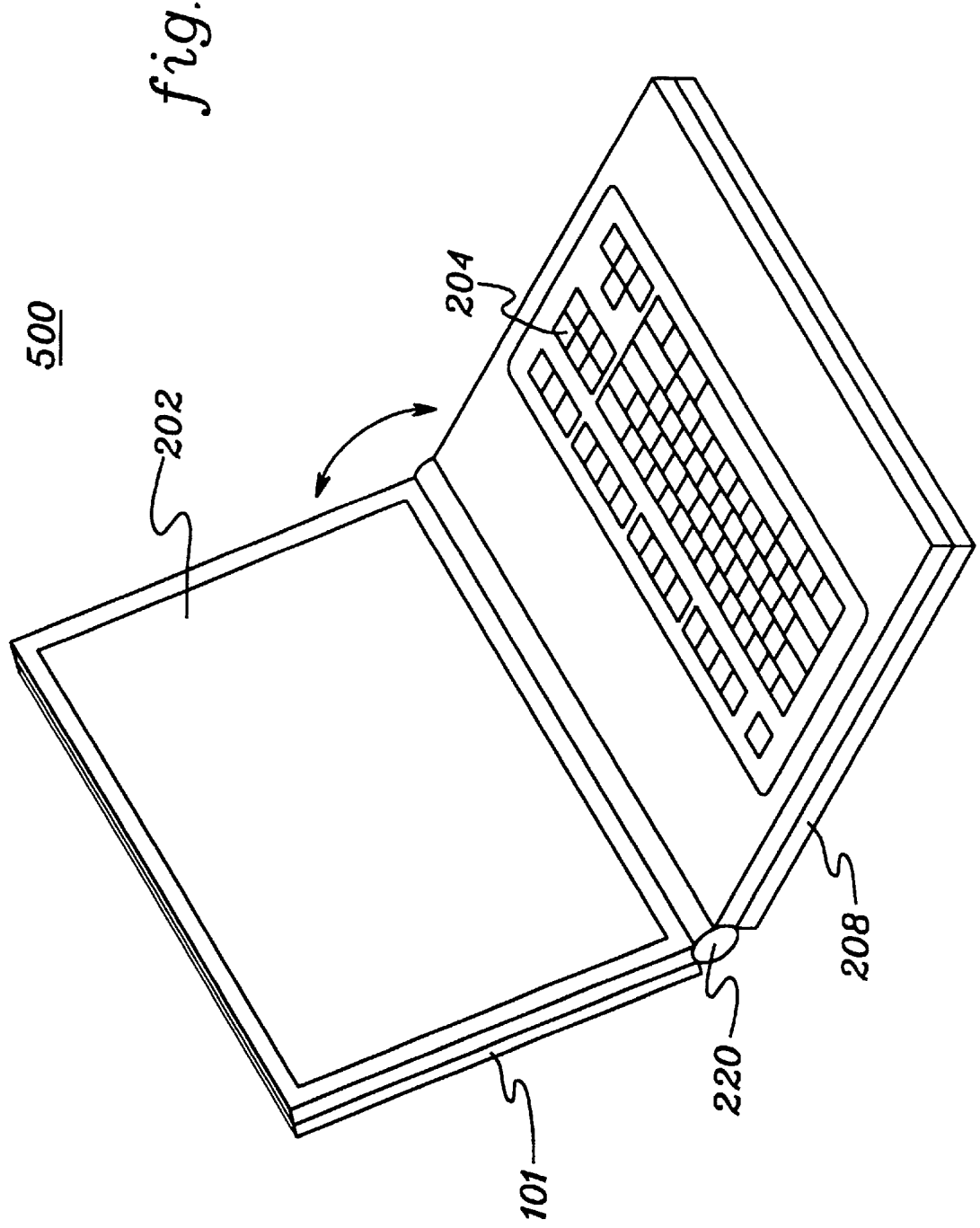
FIG. 12 is view of the computing device of FIG. 10, illustrating the display pivotally raised from a keyboard.

Moreover, as depicted in FIG. 12, the user may choose to employ keyboard 204 with display 202 by pivotally raising the display 202, where hinge 220 pivotally interconnects the display 202 and the keyboard. Casing 208 is illustrated as including a soft leather cover suited for placement over the pad 160, such as during transporting of the device 500 in its slim, enfolded, or collapsed condition, as described herein.

The thinness in profile of device 500 upon enfolding thereof is enhanced by recording unit 101 and display 202 sharing structural member 944 (FIG. 11). Nevertheless, in an alternative embodiment, the recording unit could be located on the backside of the display 202, as in device 500, yet the recording unit could be formed for selective, removable attachment and coupling at the backside of the display 202. The concept of selective attachment and selective coupling of the recording unit has been described above in relation to device 300 (FIG. 8).

Figure 13:
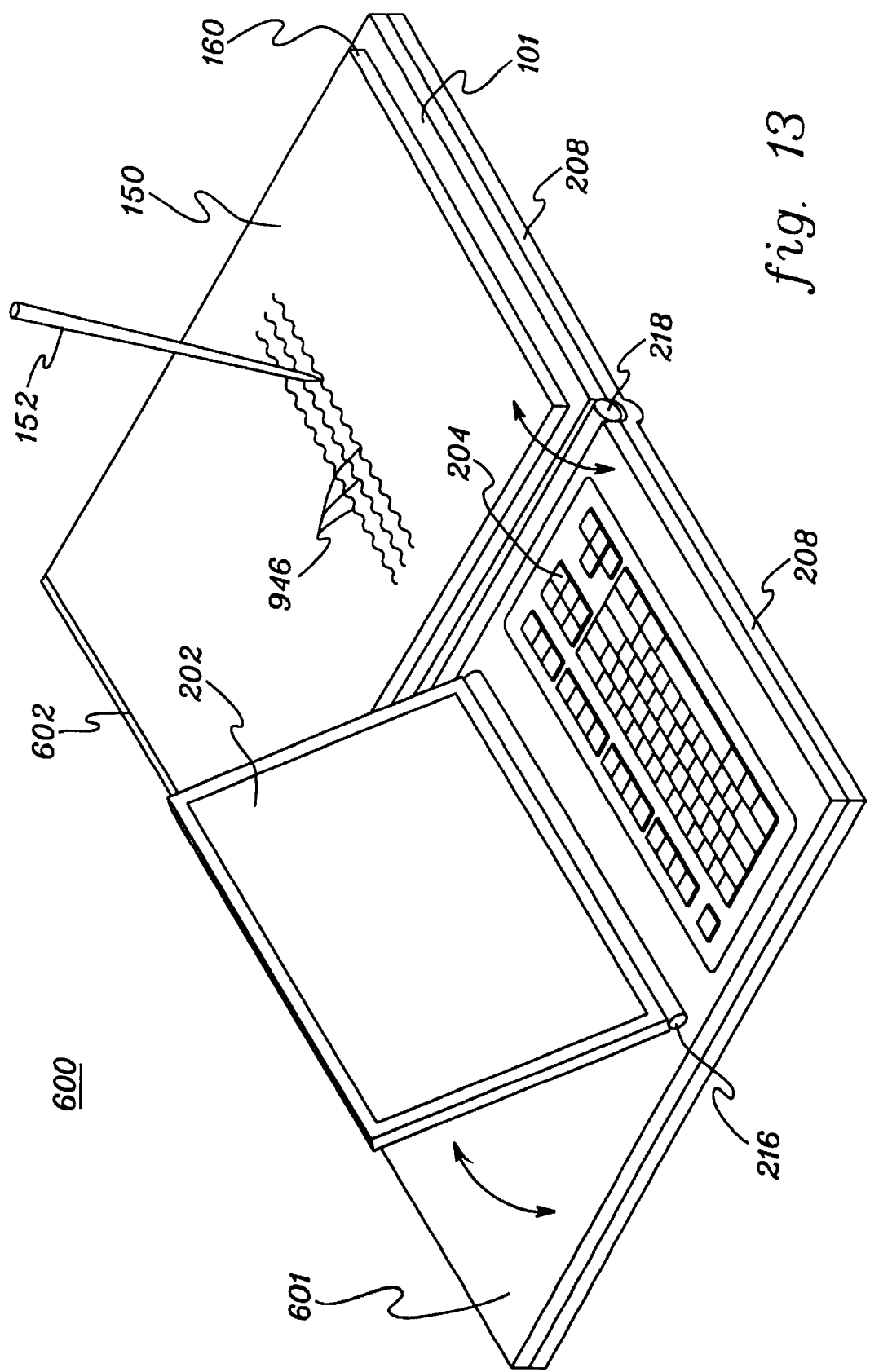
FIG. 13 is a perspective view of a sixth exemplary embodiment of the computing device of the present invention including a stylus, illustrating a display pivotally raised from a keyboard, with a recording unit and markable surface therealongside.
Figure 14:
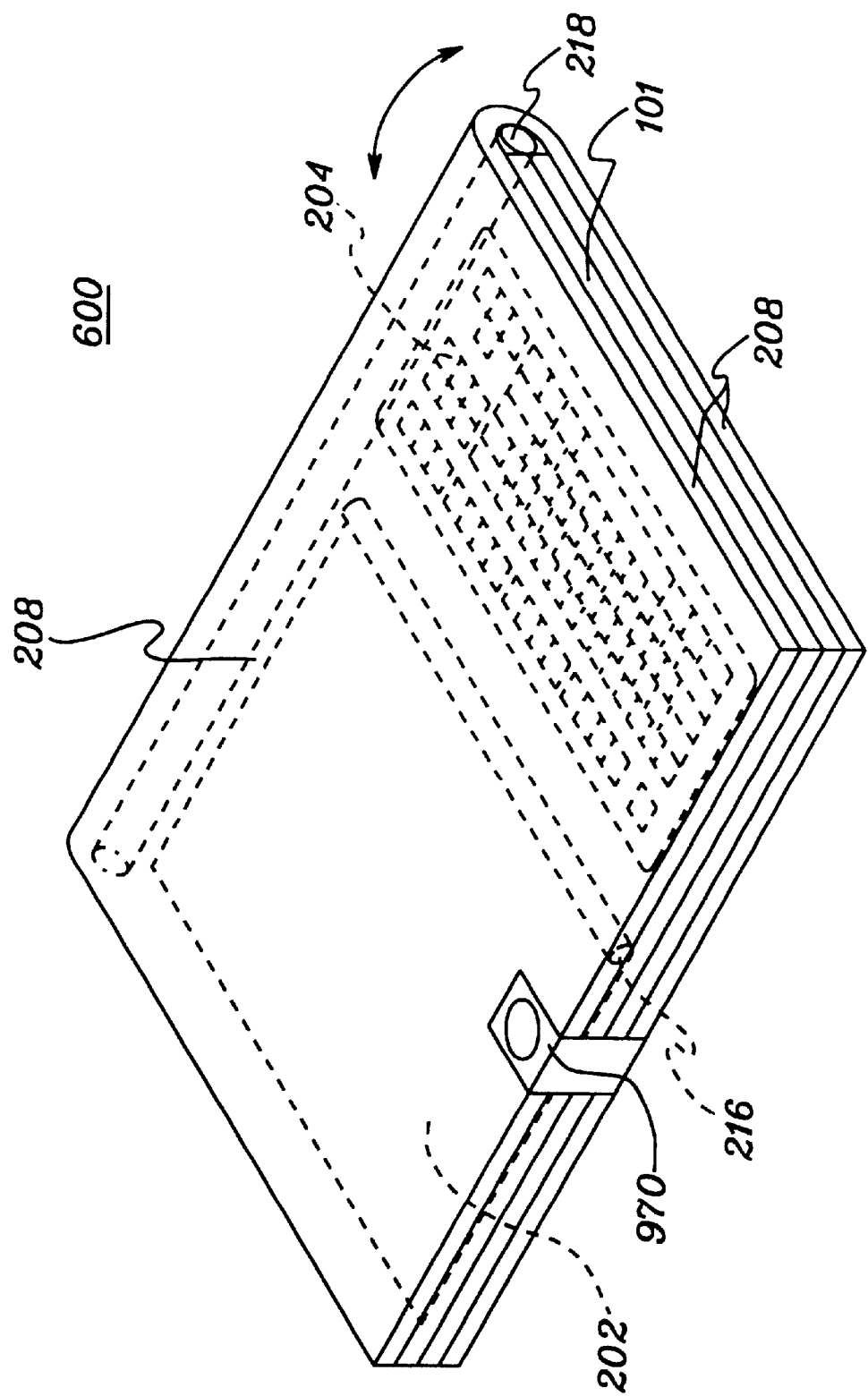
FIG. 14 is a perspective view of the computing device of FIG. 13, illustrating an enfolded condition thereof suited for transportation, in accordance with the principles of the present invention.

In a sixth exemplary embodiment, a flexibly interfaceable, portable computing device 600 (FIGS. 13–14 and 16) has first and second regions 601 and 602, as represented in FIG. 13. The first region has display 202 pivotally connected thereto by first hinge 216. Also, the first region 601 has keyboard 204 mounted thereon or therein. Furthermore, the second region 602 includes recording unit 101 therein or thereon. Second hinge 218 serves to pivotally interconnect the first and second regions.

Referring to FIG. 13, paper 150 superimposes recording unit 101. In conjunction with display 202, a user 154 can concurrently and cooperatively use both the recording unit and keyboard 204, without a need to manipulate, connect/disconnect, attach/detach and/or couple/decouple the recording unit with respect to device 600. Advantageously, a user can employ either or both of the recording unit and the keyboard for input of information to processor 420 (FIG. 4) and stimulation of display 202, at any given time or for any given purpose.

Moreover, second region 602 is preferably sized to accommodate a pad 160 of approximately 8.5 in. by 11 in. sheets 150 of paper. Further, first region 601 is sized comparably to second region, thereby allowing enfolding of device 600 in its casing 208 to form a desirably slim package, as illustrated in FIG. 14 and described herein.

As will be appreciated by those skilled in the art, in any embodiment of the present invention recording unit 101 may be selectively coupled, as depicted in FIG. 8, and/or keyboard 204 may be selectively coupled, as depicted in FIG. 9. Furthermore, as depicted in FIG. 1, in any embodiment of the present invention recording unit 101 may be permanently coupled and/or keyboard 204 may be permanently coupled. Moreover, any recording unit 101 and/or any keyboard 204 may be pivotally connectable in any embodiment of the present invention. Additionally, any hinge or the like may be mounted, attached, fastened or connected to casing 208, or merely positioned or located therein, thereon, thereat, thereover, or thereagainst. Optionally, a given hinge or the like may be shared.

Figure 16:
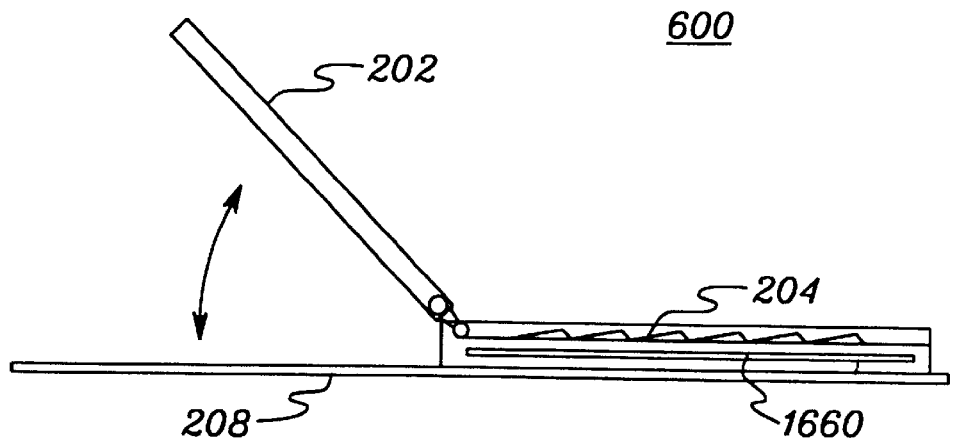
FIG. 16 is a side representation of the computing device of FIG. 13.
Figure 17:
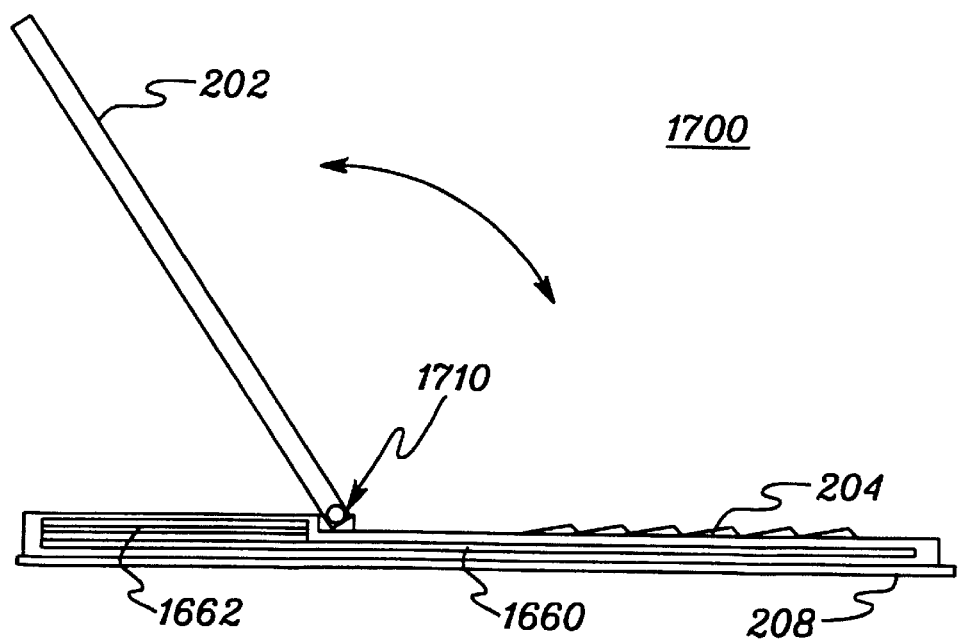
FIG. 17 is a side representation of a seventh exemplary embodiment of the computing device of the present invention.

Referring to FIG. 16, device 600 has the majority of system electronics or logic 1660 packaged in a base section, at least partially occupying space under keyboard 204. In contrast, in a seventh exemplary embodiment, a flexibly interfaceable, portable computing device 1700 (FIGS. 17–21), system electronics 1660 can be packaged such that they are not under keyboard 204, as described herein. As depicted in FIG. 17, first hinge 1710 serves as a pivot for display 202.

In device 1700, referring to FIG. 17, the entire system thickness advantageously can be substantially limited to the thickness of keyboard 204 plus the thickness of display 202, plus a selected casing 208 (e.g., associated plastic or metal covers). Thin elements of system electronics 1660, such as a printed circuit board (e.g., a motherboard) and solid-state components (e.g., memory), may be packaged in the same layer as the keyboard, but, for instance, positioned rearward therefrom, yet below the display. In one aspect, thick components 1662 (e.g., a battery, hard file, large connectors, and/or stacked PCMCIA sockets) may be positioned to the rear of both the display and the keyboard. In that location, the thick components can either occupy the entire combined thickness of the keyboard plus the display, or they can sit on top of a thin component such as a printed circuit board. By packaging all of the thickest components such that they share a layer with the keyboard and/or the display, a desirably thin configuration results, where the overall thickness of the computer subsystem may be substantially limited to the combined thickness of the packaged keyboard and display, in accordance with the principles of the present invention. Additional description regarding such feature(s) of the present invention appears further below, with reference to FIG. 40.

Figure 18:
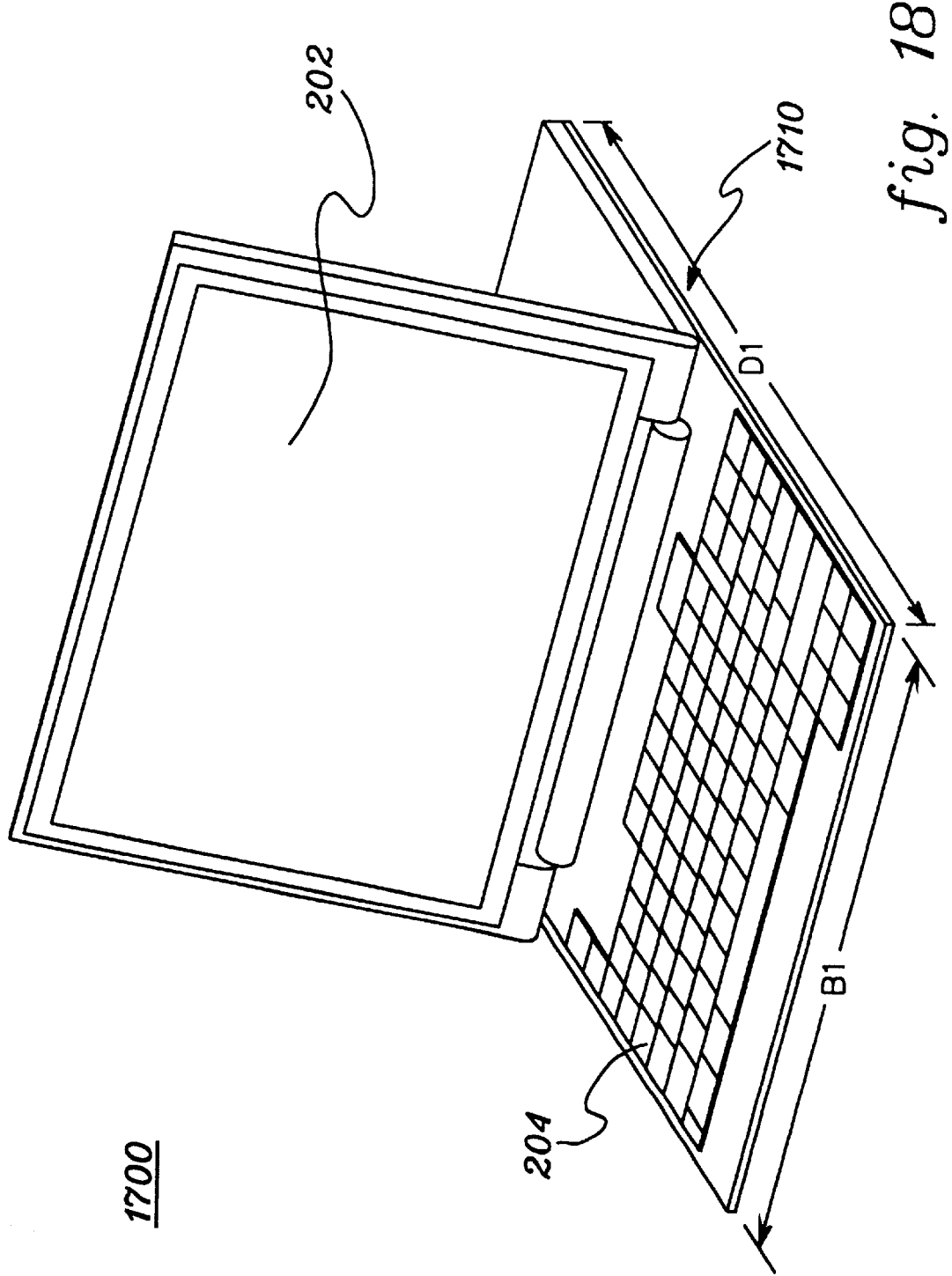
FIG. 18 is a perspective view of one example of a subsystem of the computing device of FIG. 17.
Figure 19:
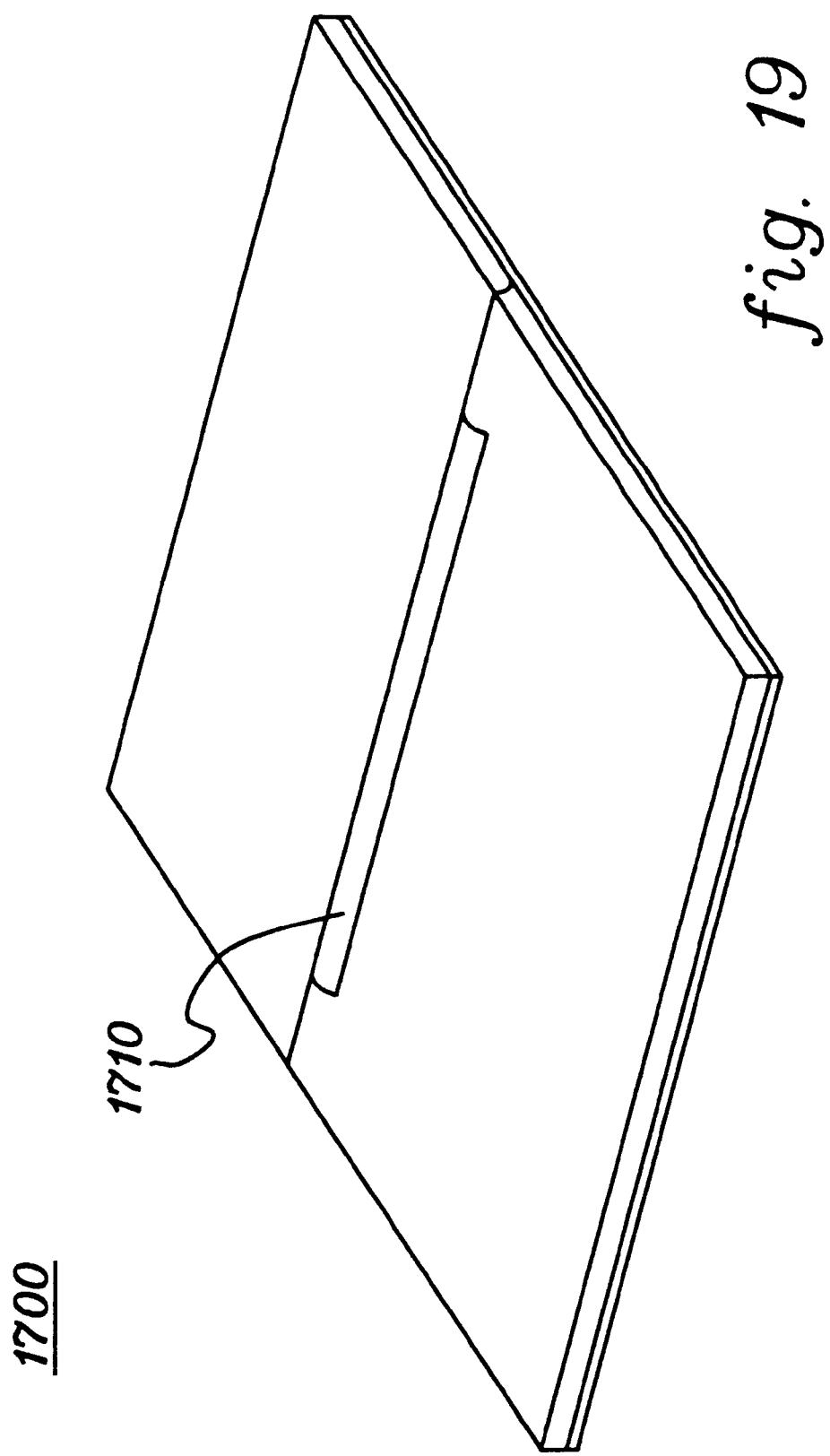
FIG. 19 is a perspective view of the subsystem of FIG. 18, illustrating an enfolded condition thereof.
Figure 20:
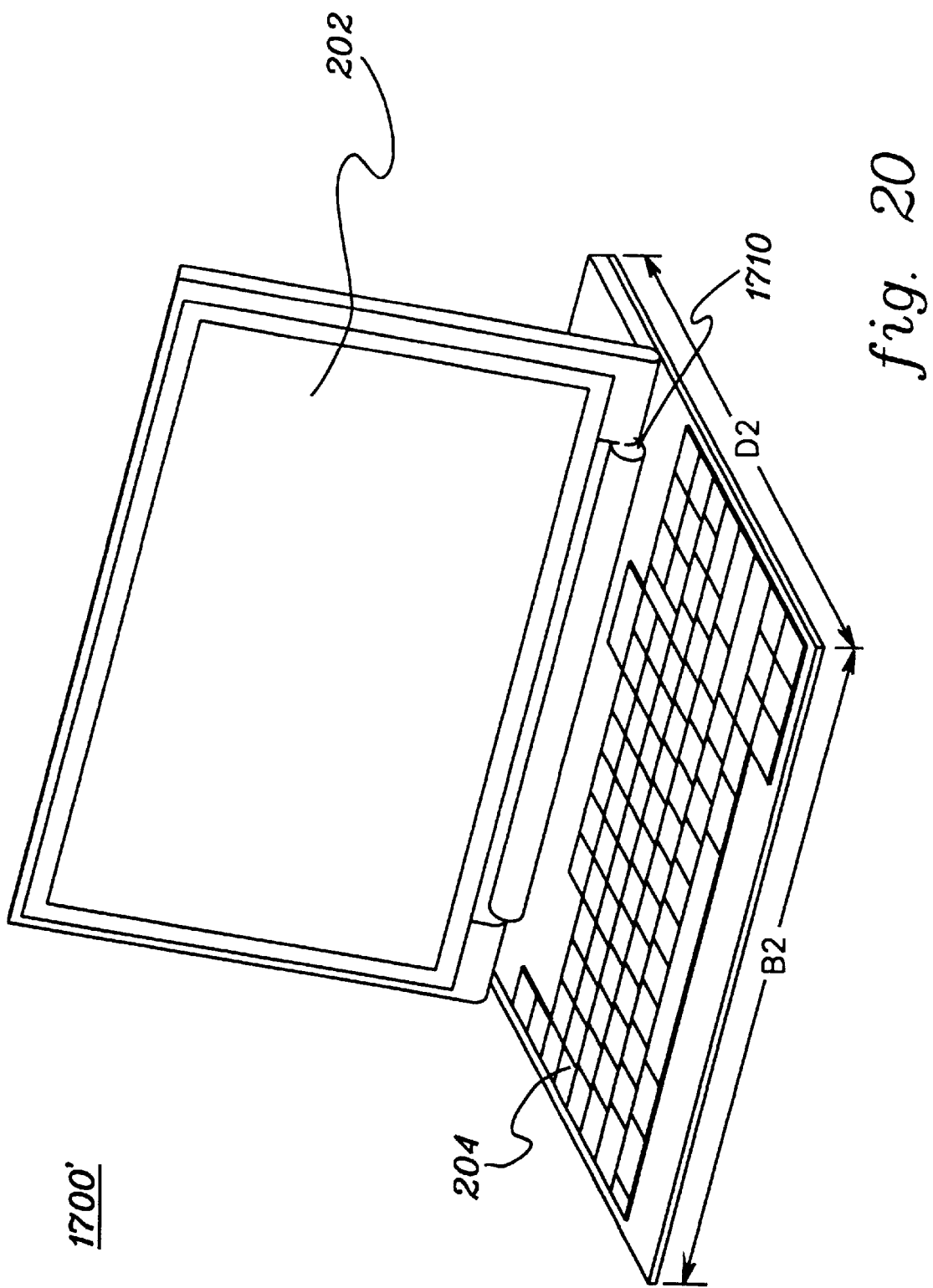
FIG. 20 is a perspective view of another example of a subsystem of the computing device of FIG. 17.
Figure 21:
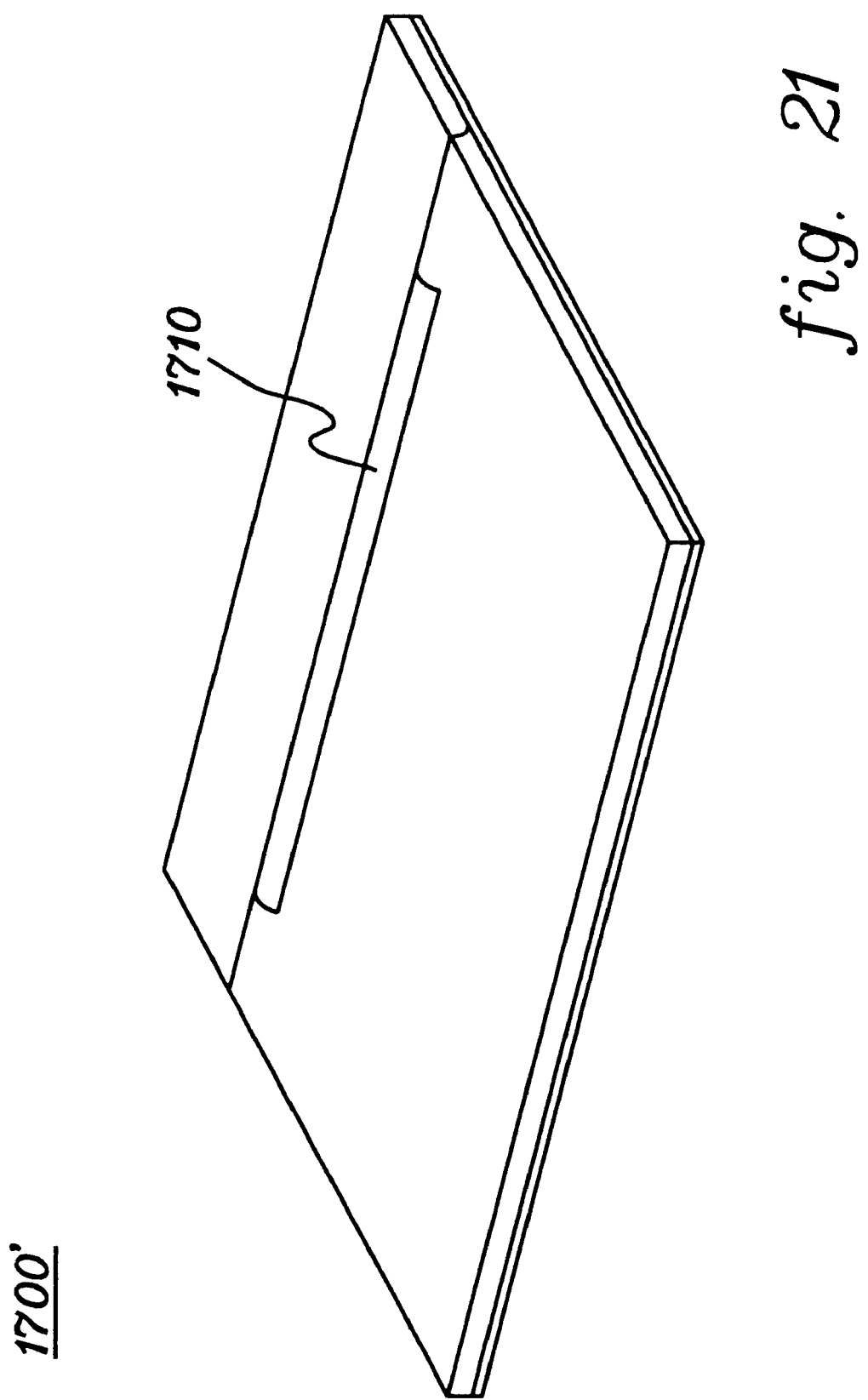
FIG. 21 is a perspective view of the subsystem of FIG. 20, illustrating an enfolded condition thereof.
Figure 22:
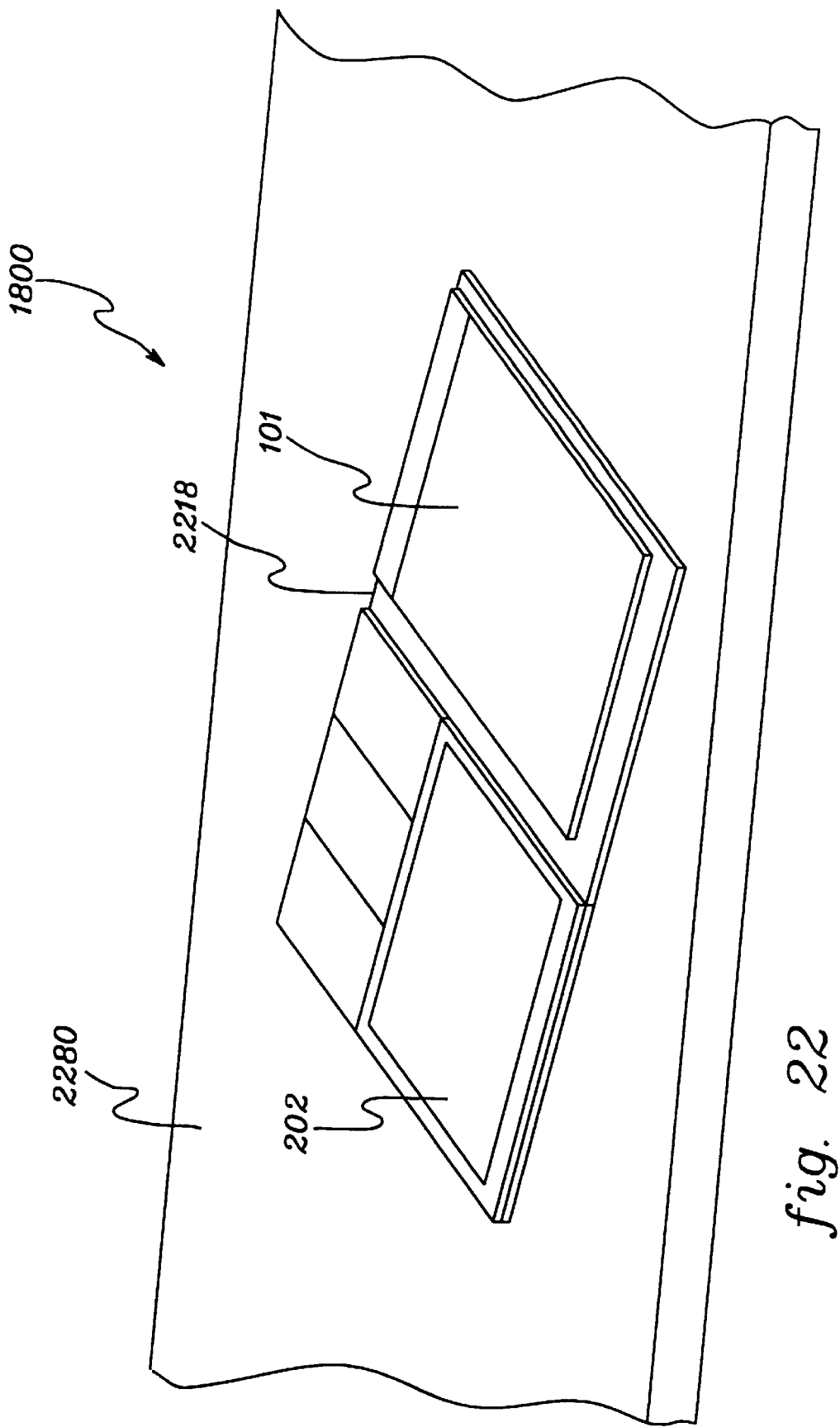
FIG. 22 is a perspective view of an eighth exemplary embodiment of the computing device of the present invention at a desk.

If the computer system depicted in FIG. 17 were detached from recording unit 101 for stand-alone use (e.g., such as at or near an exemplary hinge 2218 depicted in FIG. 22), it may appear as depicted in FIG. 18 (open) and FIG. 19 (closed). In one example, referring to FIG. 18, the computer system may have an overall width or breadth B1 of approximately ten inches, and an overall length or depth D1 of approximately twelve to thirteen inches. While these exemplary dimensions serve to approximately match the size of a recording unit designed to accommodate a full-size piece of paper, these dimensions can easily be changed without changing the basic packaging layout of the system. In another example, as depicted for device 1700' in FIG. 20, the computer system may have an overall width or breadth B2 of approximately twelve inches, and an overall length or depth D2 of approximately ten to eleven inches. For instance, the system may be so widened in order to accommodate a full-size notebook keyboard and a wider-than-normal display (e.g., the 16:9 format used in High Definition TV), while the depth of the machine has been reduced to better fit into a briefcase or computer bag. FIG. 21 depicts such a unit in the closed configuration.

With devices 1700 and 1700', depicted in FIGS. 17–21, display 202 may be opened as a "clamshell," whenever a user 154 needs to access computer information. In contrast, in an eighth exemplary embodiment, a flexibly interfaceable, portable computing device 1800 (FIG. 22), display 202 may be flipped over relative to its orientation in the devices 1700 and 1700', so that the active display surface is visible when the system is folded flat, as illustrated in FIG. 22 for explanatory purposes.

Device 1800 (FIG. 22), by exposing display 202 and by providing touch-screen sensor capability (as is known in the art) thereto, allows a user 154 to access computer functions anytime the portfolio structure is opened, as is depicted in FIG. 22 for illustrative purposes. Exemplary types of touch screens include capacitive and resistive overlays.

Additionally, surface-acoustic-wave, infrared light-beam, strain-gauge and other techniques may be employed. Any of these or other design(s) could be used in any appropriate embodiment(s) of the present invention. Referring to FIG. 22, with the display visible simply by opening the portfolio, the user may advantageously navigate and operate computer or processor 420 by using a touch-screen capability, without a need to additionally pivot and/or lift the display.

Furthermore, in accordance with the principles of the present invention, a user 154 may navigate computer or processor 420 by using stylus 152 with recording unit 101, as a pointing device in the manner of a "graphics tablet," which is a well-known type of computer input device.

Figure 23:
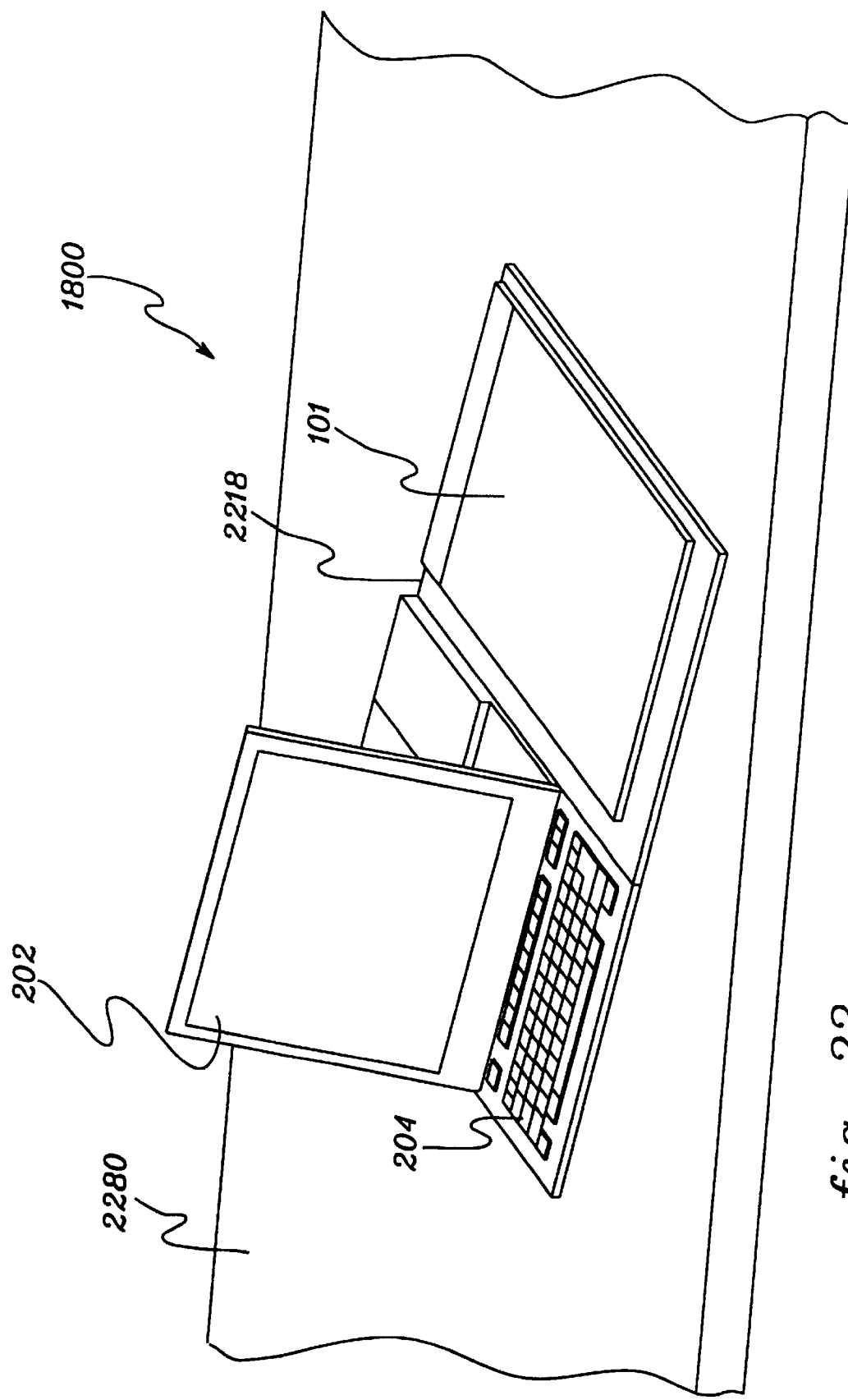
FIG. 23 is a perspective view of the computing device of FIG. 22 at the desk thereof, illustrating the display in a raised position.

As described above with respect to devices 1700 and 1700', device 1800 may be configured so the system electronics are packaged underneath keyboard 204 (FIG. 23). Some of the thin components can be packaged to the rear of the keyboard but underneath display 202, while preferably all of the thick components are packaged to the rear of both the display and the keyboard, as described herein.

Figure 24:
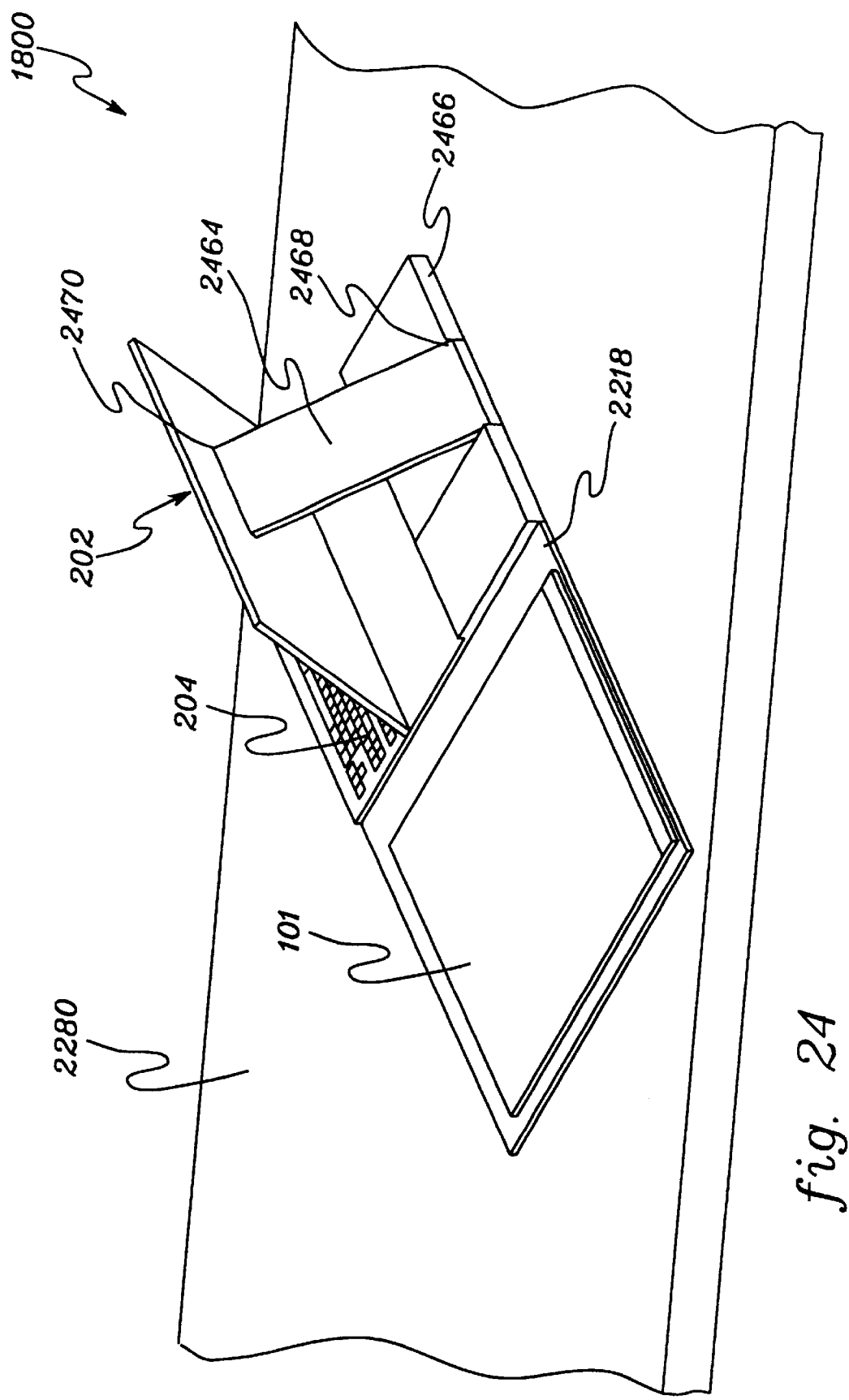
FIG. 24 is a perspective view from the rear of the computing device of FIG. 22 at the desk thereof.
Figure 25:
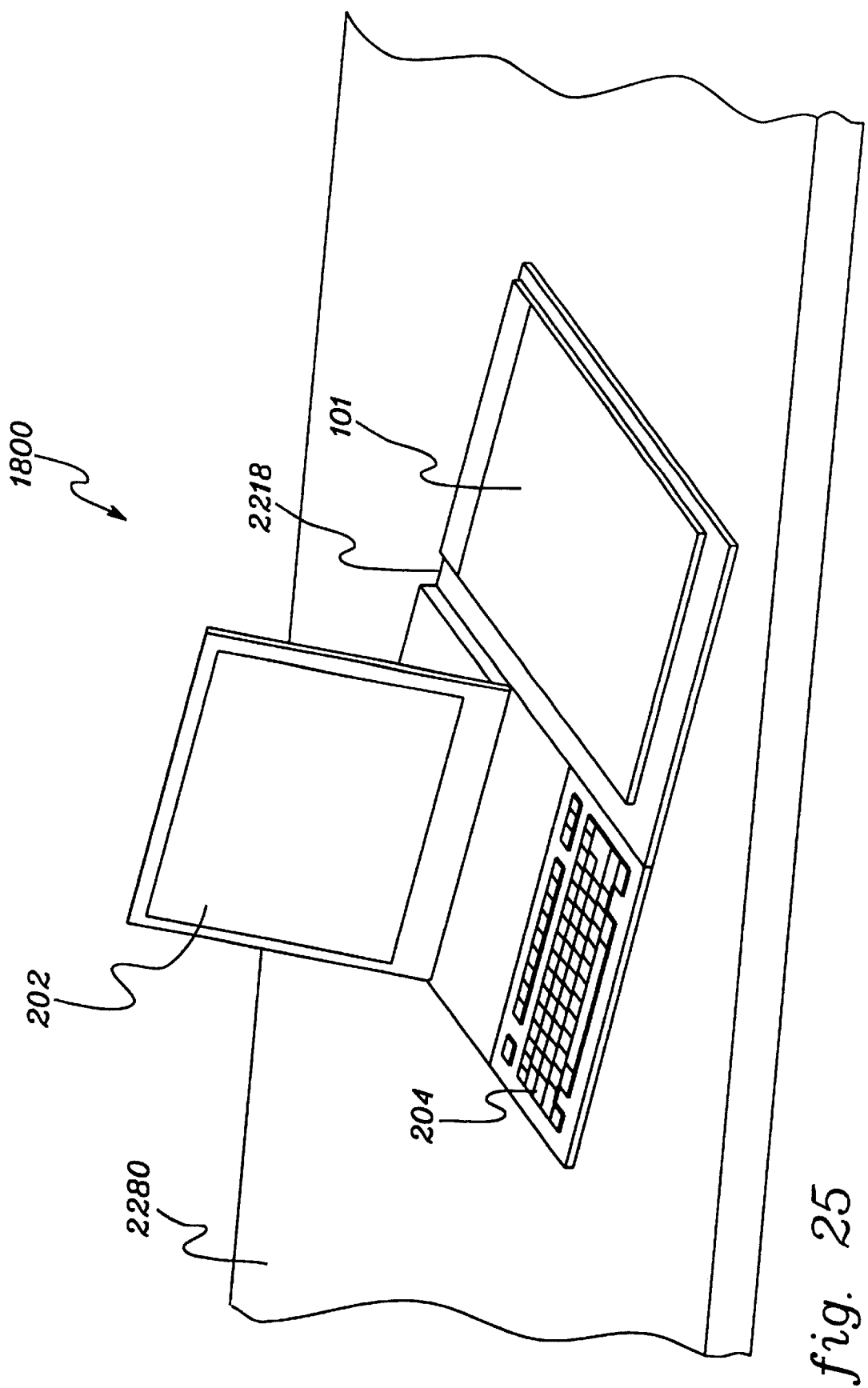
FIG. 25 is a perspective view of the computing device of FIG. 22 at the desk thereof, illustrating an alternative position for the display.

Referring to FIG. 23, in order to access keyboard 204, display 202 may be lifted. In one example, the display may be mounted to support arm 2464, as depicted in FIG. 24. The support arm may have one end hinged to base 2466 at hinge 2468, and have its opposite end hinged to the back of the display at hinge 2470. Preferably, the location of the hinge 2470 is selected so that when the system is closed, the hinge 2470 does not interfere with the keyboard. In this configuration, the bottom edge of the display may rest on tracks running along the sides of the keyboard, where the tracks may optionally have detent locations which tend to hold the bottom of the display to prevent it from sliding. Advantageously, this combination of the support arm together with the contact between the bottom of the display and the base provides a stiff and stable support for the display, desirably serving to prevent the display from moving or wobbling when the touch screen is being used. Through positioning of the hinges 2468 and 2470, the display may be placed in a variety of ergonomic viewing angles, simply by sliding the bottom of the display between the rear edge of the keyboard, and the beginning of the thick component packaging section. Such a range of display positions and/or angles can be understood through examination of FIGS. 23–25. Other viewing positions, such as a nearly flat configuration, where the display does not fully expose the keyboard, may also be attained in accordance with the principles of the present invention. In device 1800, space is preferably provided for support arm 2464 (FIG. 24) underneath display 202 and along the rear section of the device. In one example, the thin system components may be positioned behind keyboard 204 in such a way that the support arm fits between the system components and the back of the display. That is, in accordance with the principles of the present invention, the support arm and the thin system components may advantageously share a layer substantially defined by the thickness of the keyboard.

Referring to FIG. 24, in the area near hinge 2468, support arm 2464 and the taller or thicker system components preferably share a layer substantially defined by the combination of the thickness of display 202 and the thickness of keyboard 204. It should be noted, however, that the support arm may itself have a non-uniform thickness. In one example, the support arm may have a thin center section, and somewhat thicker edges. Furthermore, the layout of the system components may be accomplished with knowledge of a varying thickness of the support arm, so that the thinnest components, or perhaps no components, may be positioned under the thick sections of the support arm, while thicker components may be positioned under the thinner sections of the support arm, as will be appreciated by those skilled in the art. If it is desired to avoid having the support arm "share" the thickness available for the system components, then the support arm(s) could be positioned along the outside left and right edges of the display.

Figure 26:
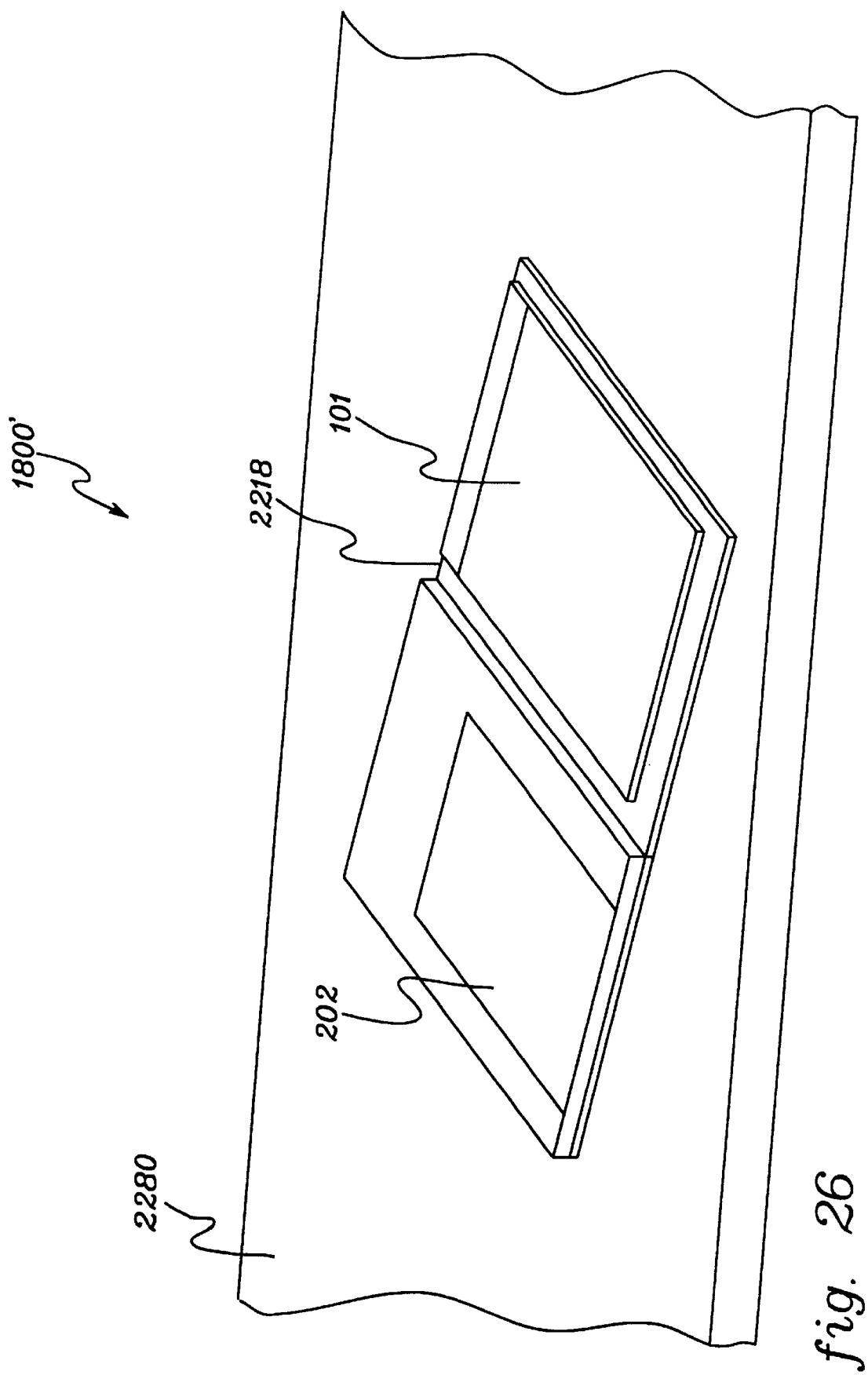
FIG. 26 is a perspective view of another example of the computing device of FIG. 22 at the desk thereof, illustrating an exemplary portrait orientation for the display.
Figure 27:
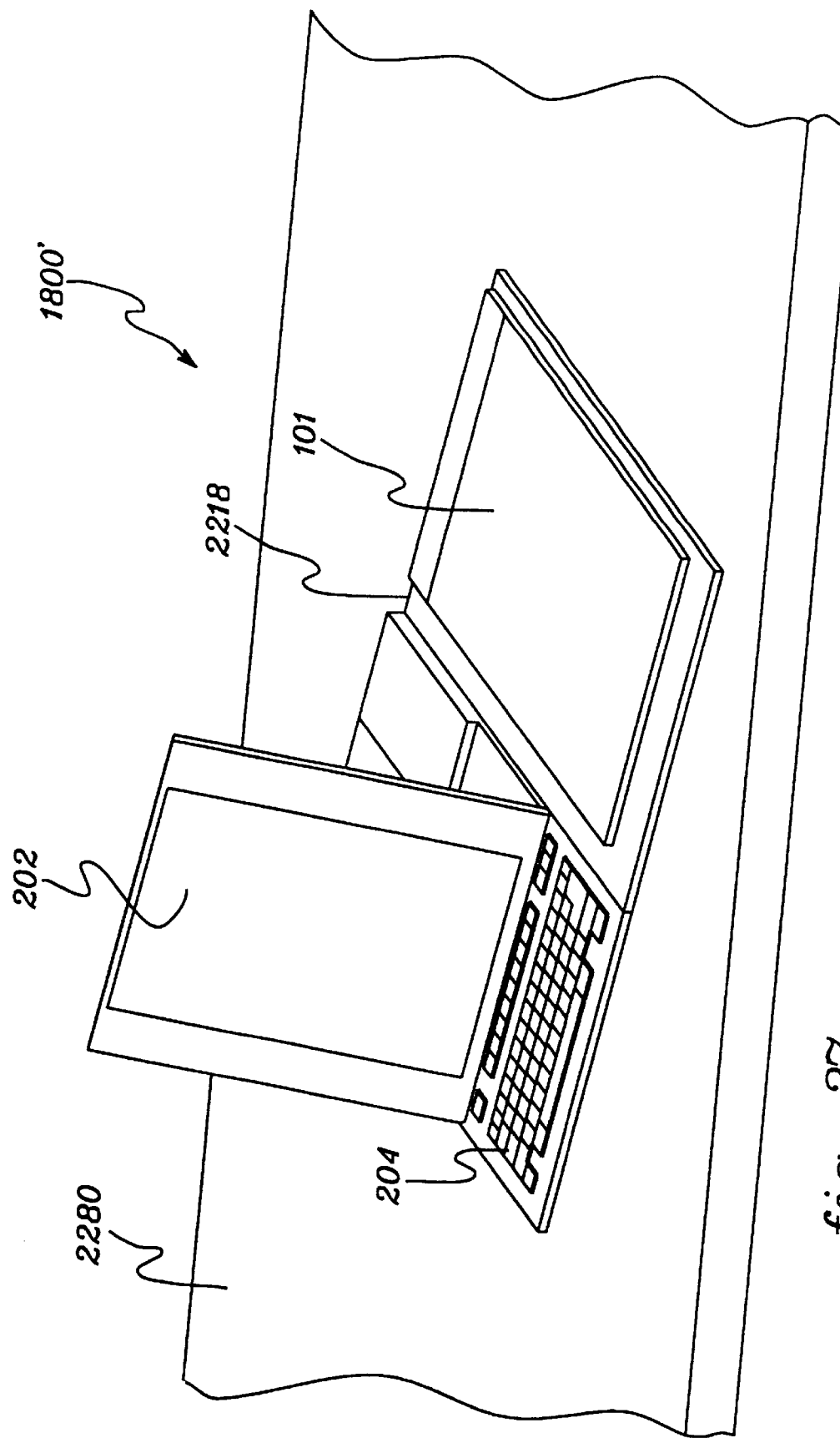
FIG. 27 is a perspective view of the computing device of FIG. 26 at the desk thereof, illustrating the display in a raised position.
Figure 28:
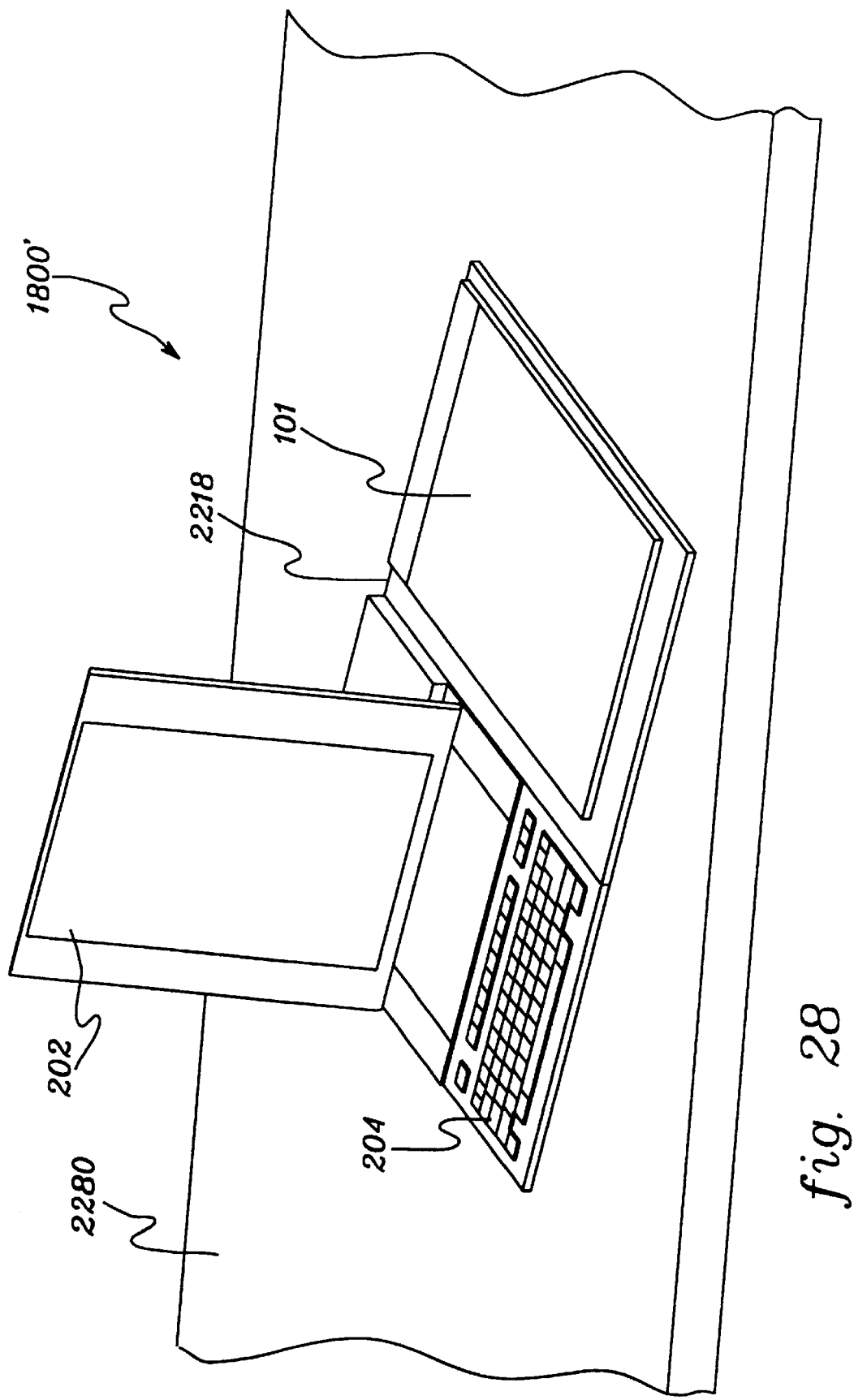
FIG. 28 is a perspective view of the computing device of FIG. 26 at the desk thereof, illustrating an alternative position for the display.

In another example, as depicted for device 1800', in FIGS. 26–28, display 202 may be mounted with "portrait" orientation. On the one hand, if the overall system dimensions remain the same as with device 1800 (depicted in FIGS. 22–25), then the device 1800' may provide somewhat less space for tall system components. However, if the electronics space is adequate, then the device 1800' allows the use of a somewhat larger display 202. For instance, the landscape-oriented display depicted in FIGS. 22–25 may be approximately 10.4 inches diagonally, while the portrait-oriented display depicted in FIGS. 26–28 may be approximately 11.3 inches diagonally.

Figure 29:
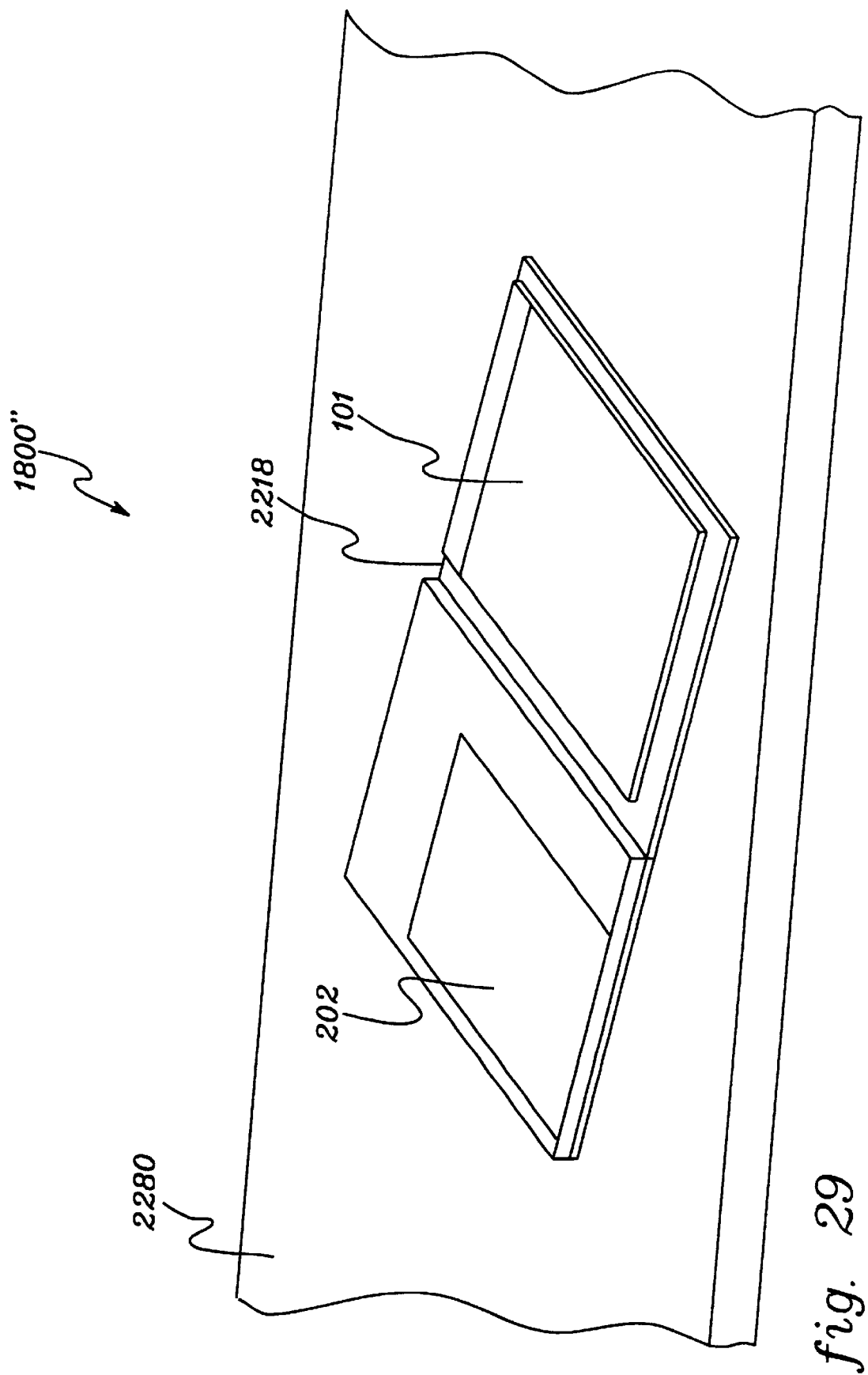
FIG. 29 is a perspective view of yet another example of the computing device of FIG. 22 at the desk thereof, illustrating a larger exemplary portrait orientation for the display.
Figure 30:
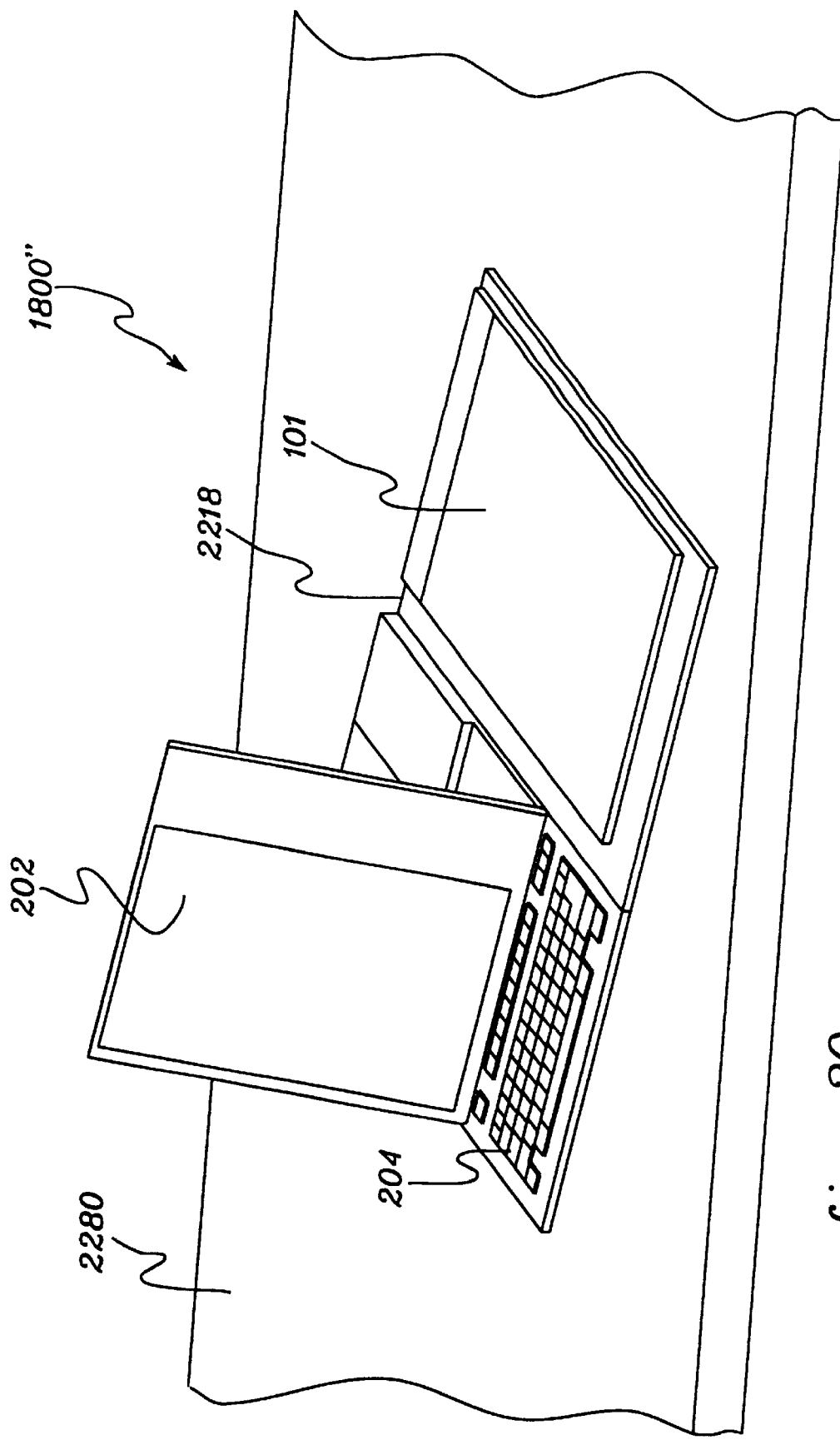
FIG. 30 is a perspective view of the computing device of FIG. 29 at the desk thereof, illustrating the display in a raised position.
Figure 31:
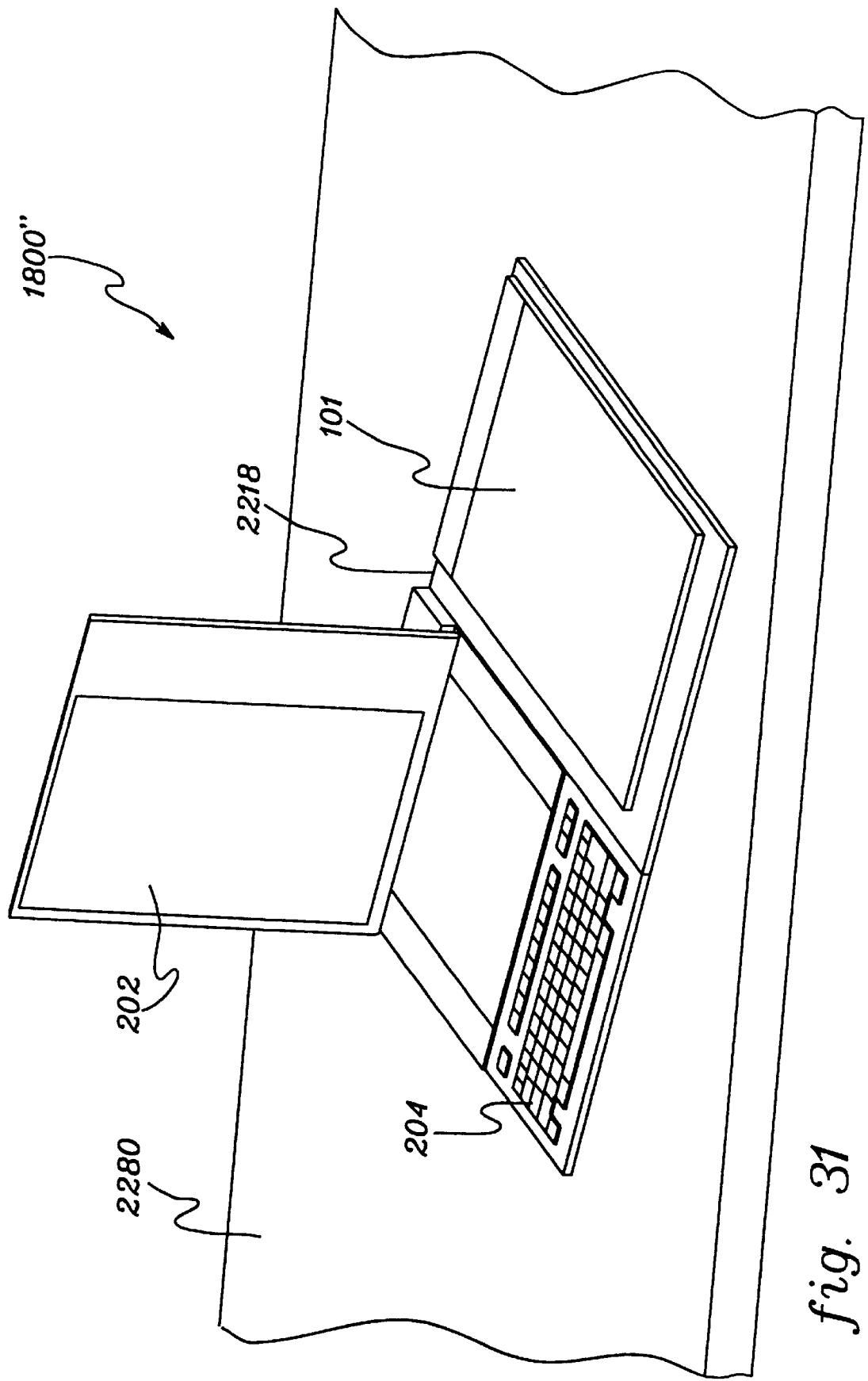
FIG. 31 is a perspective view of the computing device of FIG. 29 at the desk thereof, illustrating an alternative position for the display.

In another example, as depicted for device 1800" in FIGS. 29–31, if an even larger portrait-oriented display is desired, it may be accommodated by, for instance, shifting display 202 to one side. For instance, the device 1800" depicted in FIGS. 29–31 may have a 12.1 inch diagonal portrait mode display. Referring to FIGS. 30–31, some of the thicker electronic components may be positioned underneath the right edge of the display, in the region behind keyboard 204, in accordance with the principles of the present invention. If, for example, it is possible to package all of the system components underneath the display with an acceptable overall system thickness, then the display 202 alternatively may cover substantially the entire exposed surface of its associated panel, as will be appreciated by those skilled in the art.

In a ninth exemplary embodiment, a flexibly interfaceable, portable computing device 1900 (FIGS. 32–39) may have hinge 3268 for support arm 2464, positioned just behind the rear edge of display 202, as depicted in FIGS. 32–34. So, the display may be moved into various positions, as depicted for illustrative purposes in FIGS. 32 and 36–38. In one example, the display may be lifted so that the lower edge is no longer in contact with, for instance, rail(s) along the side(s) of keyboard 204. Advantageously, this provides substantially more flexibility for a user 154 in ergonomically positioning the display. Referring to FIG. 32, hinges 3268 and 3270 on the support arm allow, for instance, the user to vary both the viewing angle of the display, and the average distance to the display (e.g., measured from the user's eyes) within some range, in accordance with the principles of the present invention. Furthermore, such adjustment(s) as these may be made relatively independently of one another, such as when the display is positioned within a normal or usual range of viewing conditions. In order to ensure that, for example, the display may remain fixed at any selected position(s) and angle(s), there may preferably be provided a sufficient amount of friction and/or spring counter-balance force(s) at hinge 3268 and/or hinge 3270.

Figure 38:
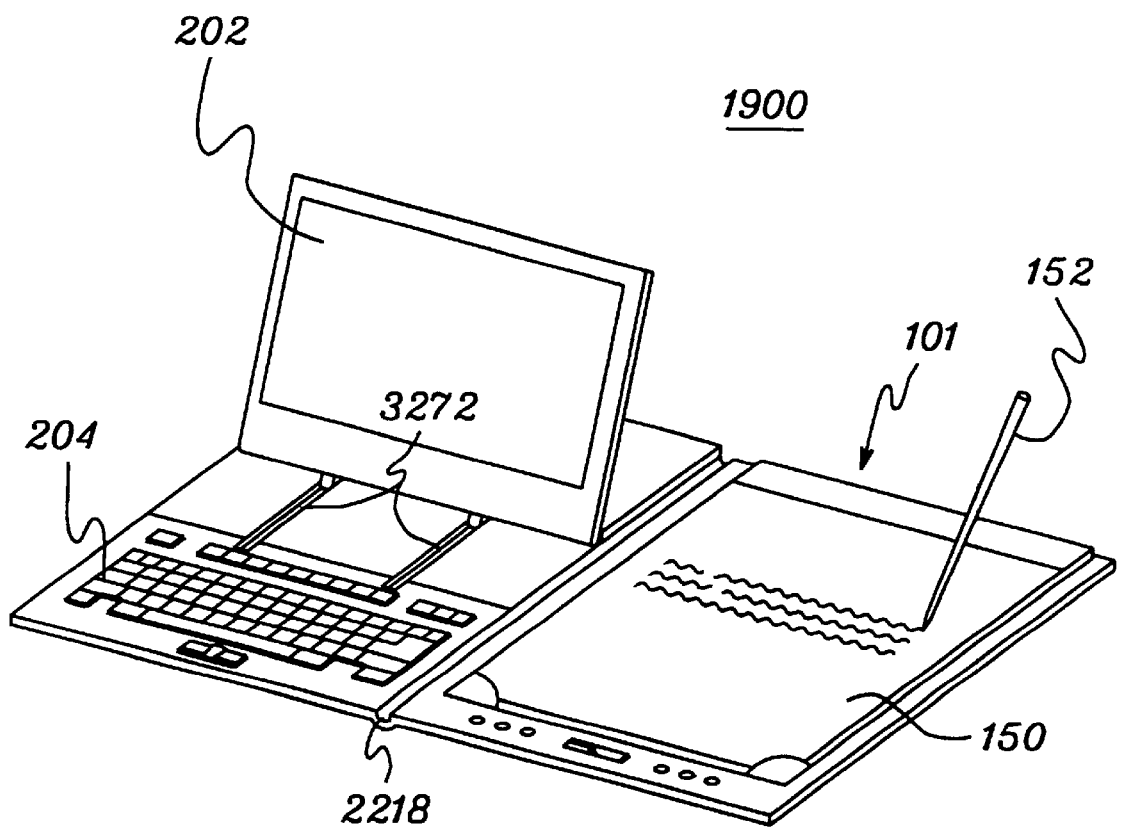
FIG. 38 is a perspective view of the computing device of FIG. 32 including a stylus, illustrating the display in a raised position.

Referring to FIGS. 33–34, hinge 3270 may be positioned in region(s) shared with part(s) of keyboard 204. This may be done, in accordance with the principles of the present invention, without causing physical interference since, for instance, small pivoting element(s) which comprise hinge 3270 may be located where there are no keys, such as in position(s) of the last row(s) of keys of the keyboard, as illustrated in FIGS. 33 and 38. Such type(s) of keyboard layout(s) may serve to permit hinge 3270 to be located near an optimal location, such as approximately near the middle of display 202, as depicted in FIG. 32.

Figure 39:
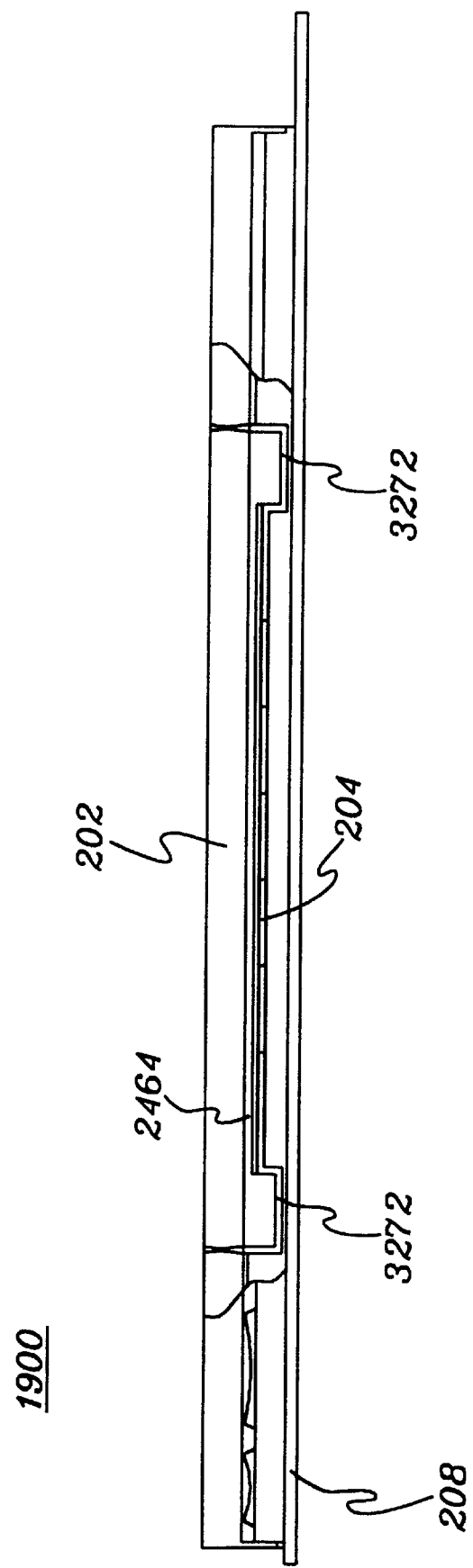
FIG. 39 is a magnified, cutaway, sectional, partial view directed substantially along line 39—39 of FIG. 33.

Referring to FIGS. 32, 34, and 39, support arm 2464 preferably extends under display 202, for instance, in a layer shared with keyboard 204. To minimize the effect this could have on the electronics packaging, in one example, the support arm is designed to be very thin over most of its width, but to have somewhat thicker edges to provide adequate stiffness and strength, as represented in FIG. 39. These thicker edges of the support arm preferably fit into recesses 3272 in the electronics section behind the keyboard, as can be understood through examination of FIGS. 38–39.

For illustrative purposes, exemplary overall thicknesses of enfolded devices of the present invention are now discussed. The enfolded concept may be understood through examination of FIG. 14 in conjunction with any number of the other Figure(s). In one example, a device 100 as depicted in FIGS. 1–3, may have an enfolded thickness in the approximate range of twenty-five to thirty-five millimeters, plus an arbitrary additional thickness (e.g., about one to three millimeters on a side) for casing 208. In another example, a device 1900 as depicted in FIGS. 32–39 may have an enfolded thickness in the approximate range of twenty to twenty-three millimeters, plus an arbitrary additional thickness for the casing.

Figure 40:
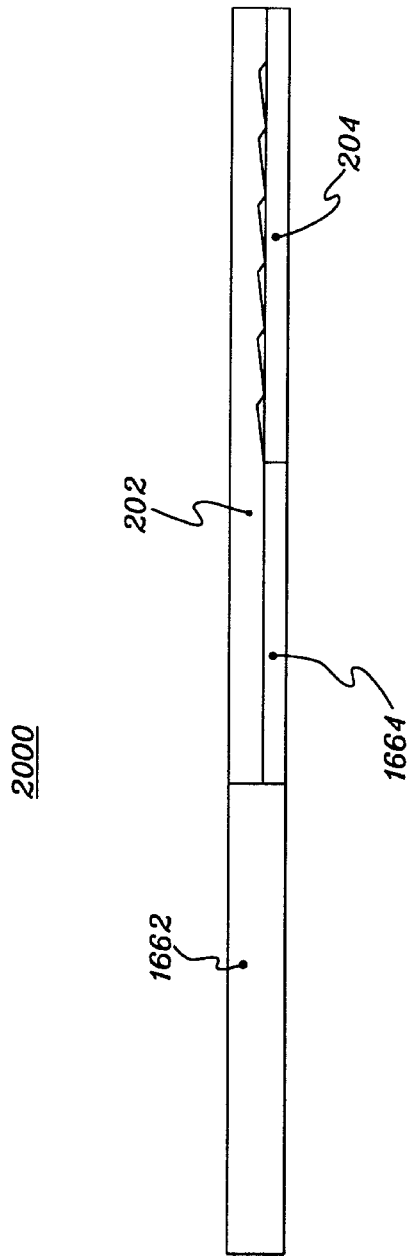
FIG. 40 is a side representation of an exemplary packaging scheme for the computing device(s) of, for example, FIGS. 17, 22, and/or 32.

As depicted in FIG. 40, relatively large and/or thick (e.g., logic) component(s) 1662, 1664 may advantageously be positioned away from (e.g., rearward of) keyboard 204, as described herein. In one example, no significant system components are packaged under the keyboard. For instance, the thickness of system 2000 may be substantially determined by the thickness of the packaged keyboard (e.g., typically in the approximate range of 5–10 mm) plus the thickness of display 202 (e.g., usually in the approximate range of 5–10 mm), as can be understood through examination of FIG. 40. Certain relatively thin logic or "system" element(s) 1664 may be packaged underneath the display, for instance, in a region not occupied by the keyboard, since the keyboard is generally not as large as the display, when measured front to back, as illustrated in FIG. 40 for explanatory purposes. Furthermore, the thicker or "taller" logic or "system" component(s) 1662 (e.g., batteries, a hard-file, stacked PCMCIA slots, I/O connectors, the processor, heat sinks, and/or cooling fans) are preferably all packaged outside of the perimeter of both the display and the keyboard, where they are free (e.g., either alone or in combination) to occupy the entire combined thickness of the keyboard plus the display, in accordance with the principles of the present invention.

Referring to FIG. 40, display 202 may be mounted in many different ways without substantially deviating or departing from this exemplary or basic packaging layout or scheme, in accordance with the principles of the present invention. In one example, as in devices 1700 and 1700' (FIGS. 17–21), the display may be mounted at or near a section of "tall component(s)" 1662 (FIG. 40), such as with a hinge 1710 (FIGS. 17–21), and with the active surface of display 202 pointed or opened towards keyboard 204. In another example, as in devices 1800, 1800', and 1800" (FIGS. 22–31), the inactive (e.g., back) surface of the display may face the keyboard, and, as depicted in FIG. 24, the display may be mounted to a support arm 2464, such as with hinges 2468 and 2470. For illustrative purposes, FIG. 24 depicts the hinge 2468 for the support arm located near an extreme end of the machine, and hinge 2470 for the support arm located appropriately along the back surface of the display. In yet another example, as in device 1900 (FIGS. 32–39), hinge 3268 for the support arm may be located just beyond the perimeter of the display, and hinge 3270 may be positioned near the center of the back of the display, in accordance with the principles of the present invention.

In another aspect of the present invention, a user 154 may be allowed to operate a stylus 152 as a pointing device, for example, through provision of a convenient mechanism or way to switch modes. For instance, a certain mode for the stylus may have the location thereof sent in real time to processor 120, 420 (e.g., rather than being stored for later transmission). Further, in such a mode, the stylus may be prevented from marking on paper 150, while it is being used to position a cursor on display 202, in accordance with the principles of the present invention. One way to accomplish this is to build a sliding switch or push-button 3554 (FIG. 35) into the stylus, as will be understood by those skilled in the art. When pressed by the user, this switch may modify a signal sent from the pen to recording unit 101, so that pen strokes may be treated as cursor positioning (e.g., "mouse") command(s). In addition, activation of the switch or button may prevent marking on the paper, such as by either retracting an inking tip or extending a non-inking tip. Thus, the user could conveniently switch from "inking mode" to "cursor or graphics-tablet mode" simply by activating the button or switch, and then continuing to move the stylus over the surface of the paper. In one example, motion of the stylus in such a mode may directly control the position of the cursor (in either "absolute" or "relative" mode), but, preferably, no visible record of the stylus motion would be recorded on the marking surface. Such dual-mode pens are widely known in the art of graphics tablets, where they are sometimes used to provide a pen with two active ends. In accordance with the principles of the present invention, such a pen 152 may be turned over or reversed, and a second active end be used to send a different signal to the recording unit, so that the computer can treat the incoming data stream differently. In a typical case, the second end of the pen may serve as an electronic "eraser," so that whenever the user turns the pen over, a (e.g., graphics) program may interpret the strokes as being "electronic eraser strokes" rather than as "electronic inking strokes." A further use of such a double-ended stylus approach may allow the user to flip the pen over to switch from physical inking mode to a non-inking, cursor-positioning mode. Regardless of how the mode switching is accomplished, the computer "select" task(s) normally performed with, for example, a (e.g., left) mouse button may instead be performed simply by, for instance, pressing sufficiently on the pen to activate the "pen-down" function, or by clicking on a separate button on the pen.

Figure 35:
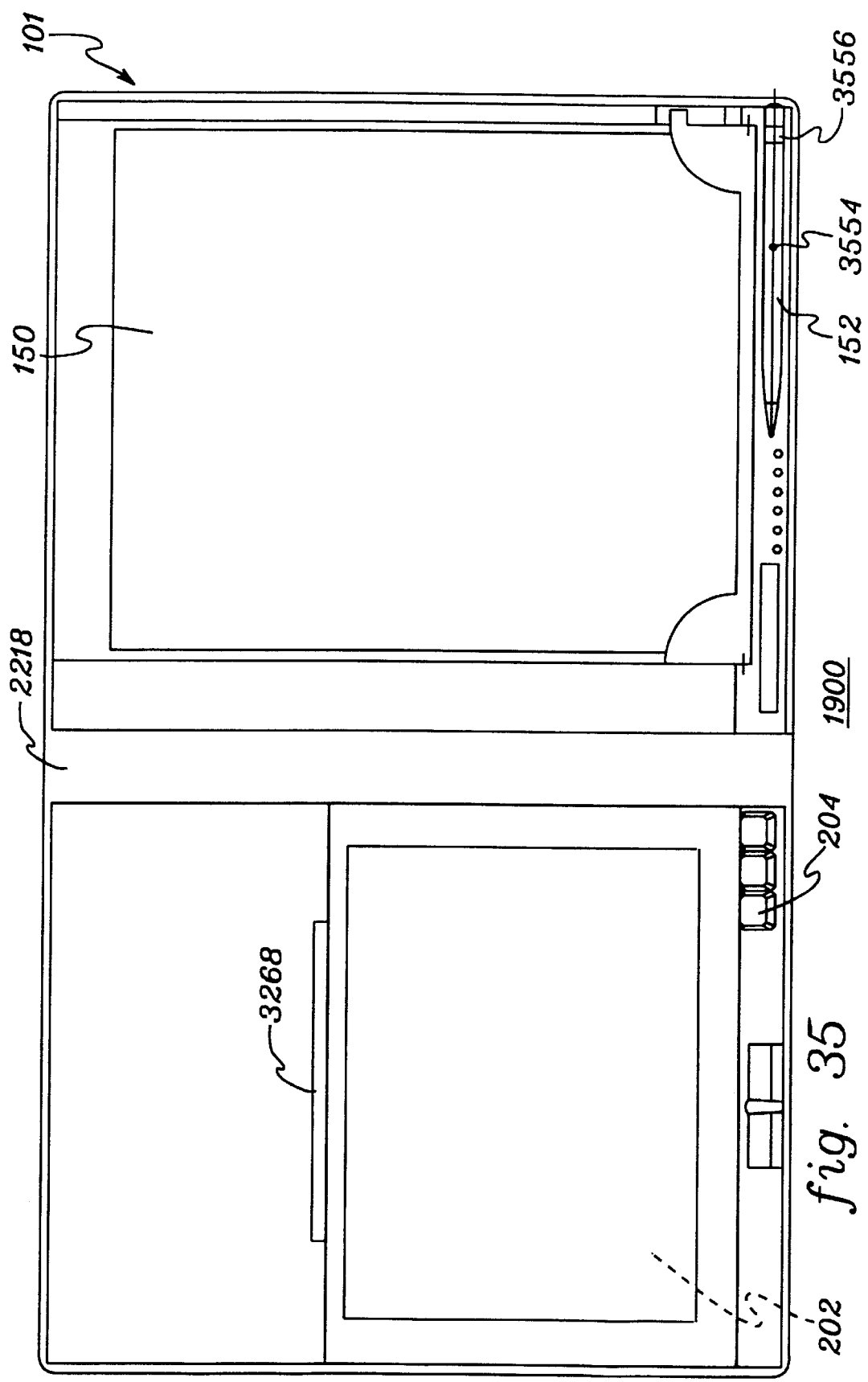
FIG. 35 is a plan view of the computing device of FIG. 32 including a stylus.
Figure 37:
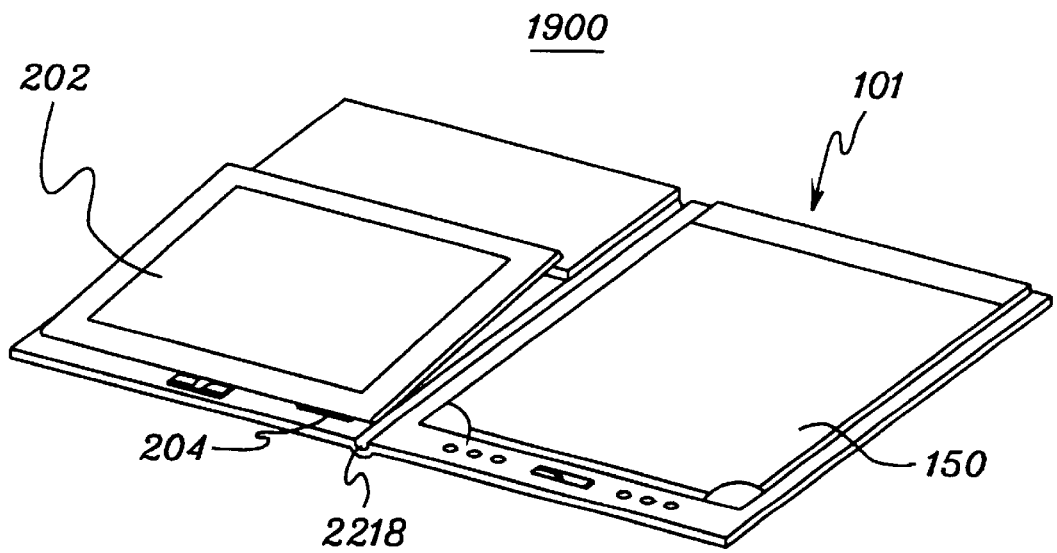
FIG. 37 is a perspective view of the computing device of FIG. 32.
Figure 36:
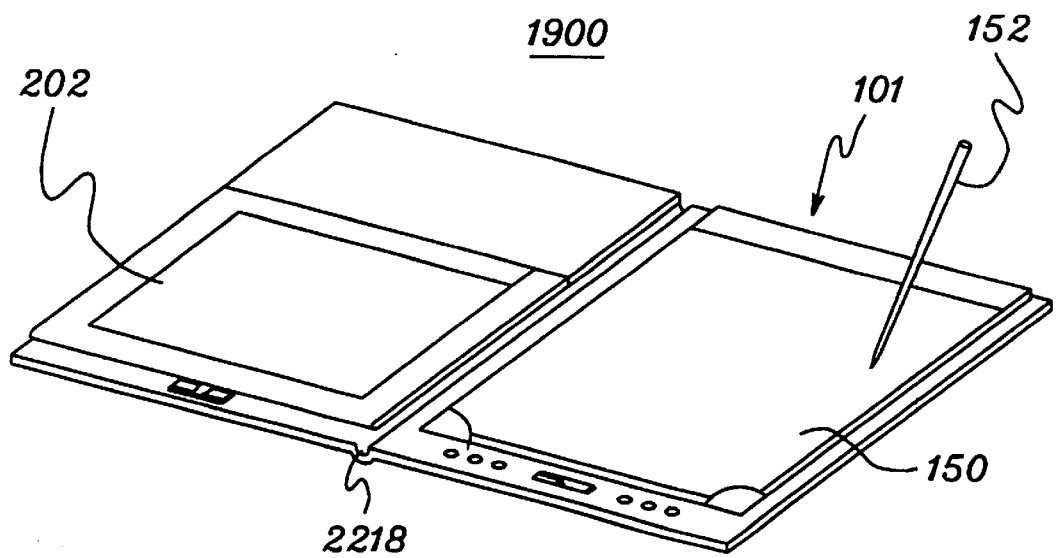
FIG. 36 is a perspective view of the computing device of FIG. 32 including a stylus.

In yet another aspect of the present invention, where stylus 152 is configured to include a small battery, other electronic function(s) might be added, such as that of a wireless microphone 3556 (FIG. 35). By including a microphone near the non-inking end of the stylus, and by incorporating a wireless transmitter into the pen and a suitable receiver into the system, there may be provided the function of a wireless microphone, in accordance with the principles of the present invention. Such a wireless transmission link could be analog or digital, and it could use, for example, infrared light, radio-frequency transmission, or near-field capacitive or inductive coupling. Advantageously, such a wireless microphone may satisfy an important need, because many applications of speech recognition require the use of a "close-talking" microphone, to improve the signal-to-noise ratio of the captured speech relative to the background noise. Since previous portable PC devices have had their microphones built directly into the body of the devices (i.e., at a location which is relatively far from the user's mouth), they have been unable to adequately provide the highestperformance speech functions. Conveniently, the present invention, in one embodiment, may build the microphone into an element of the system, such as the stylus, which the user may often already be, for instance, holding in hand, and which may already include a battery and simple electronics. Desirably, it would be quite natural for the user to simply move the stylus closer to his or her mouth, and speak into the end of the stylus. The microphone signal may then be transmitted (e.g., via an analog IR signal) to the system unit, where speech recognition and/or recording function(s) may be performed, in accordance with the principles of the present invention. Activation of the microphone and the wireless transmission circuitry may be enabled, for instance, by a button (e.g., such as button 3554 depicted in FIG. 35) on the pen, as will be understood by those skilled in the art.

With regard to system electronics, various type(s) of computer function(s) may be packaged into any appropriate embodiment(s) of the present invention. In one example, processor 420, along with a hard disk drive and other memory, may comprise a full "personal Computer." In an alternative embodiment, the system may comprise a "Network Computer" or a WINDOWS® CE machine, which generally would not require a hard disk drive. Feature(s) such as specific I/O connector(s), docking connector(s), PCMCIA slot(s) and/or memory expansion, may or may not be included, depending on, for example, target market(s) and/or application(s). Also, the specific type(s) of display 202 may vary (e.g., TFT-LCD and/or DSTN-LCD), as may the size, layout, and/or key travel for keyboard 204.

Numerous alternative embodiments of the present invention exist. Markable surface 150 might have any form and/or include any constituent material(s). Additionally, stylus 152 might operate with any number of signal(s), which recording unit 101 and/or device 100 might interpret in any number of way(s). In one example, stylus 152 might have a physical (e.g., cable) link with recording unit 101 and/or device 100.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A flexibly interfaceable portable computing device, comprising,:

a first processor;

a display coupled to said first processor and a keyboard coupled to said first processor, wherein said display and said keyboard provide a first user interface to said first processor;

a recording unit including a working surface thereon and said recording unit including a second processor;

said working surface being superimposable with a removable markable surface;

a stylus allowing user marking on said markable surface when said working surface is superimposed with said markable surface, said stylus providing a stroke signal and a stroke mark, said stroke signal conveying to said recording unit a section of information, said stroke mark conveying to said markable surface said section of information; and said recording unit selectively coupled to said first processor, wherein said recording unit, said markable surface, and said stylus provide a second user interface to said first processor.

2. The device of claim 1, wherein said second user interface further comprises said display.

3. The device of claim 2, further comprising a logic design implementation coupled to said first processor, wherein said logic design implementation allow user switching among viewing modes for said display.

4. The device of claim 3, wherein said viewing modes include portrait and landscape modes.

5. The device of claim 2, further comprising a logic design implementation coupled to said first processor, wherein said logic design implementation serves to switch among viewing modes for said display.

6. The device of claim 5, wherein said logic design implementation switches among said viewing modes responsive to status of one or more of said keyboard and said recording unit.

7. The device of claim 6, wherein said viewing modes include portrait and landscape modes, wherein said logic design implementation switches to portrait mode when said recording unit is coupled to said first processor and in use, and wherein said logic design implementation switches to landscape mode when said keyboard is in use.

8. The device of claim 1, wherein said recording unit includes a second display.

9. The device of claim 1, wherein said processor is a first processor and said recording unit includes a second processor.

10. The device of claim 1, wherein said first and second processors are coupled to respective first and second logic design implementations which serve to synchronize information between said first and second processors.

11. The device of claim 1, wherein said display includes a touch screen, and wherein said touch screen provides a third user interface to said processor.

12. The device of claim 1, wherein said stylus provides selectable first and second operating modes thereof, wherein said first operating mode serves to provide said stroke signal and said stroke mark, and wherein said second operating mode serves to provide a stroke signal for at least one of pointing and drawing with respect to said display.

13. The device of claim 1, wherein said stylus and said device include a wireless link therebetween.

14. The device of claim 1, wherein said stylus includes a microphone, and wherein said microphone provides a third user interface to said first processor.

15. A flexibly interfaceable portable computing device, comprising:

a first processor;

a display coupled to said first processor and a keyboard coupled to said first processor, wherein said display and said keyboard provide a first user interface to said first processor;

a recording unit including a working surface thereon and said recording unit including a second processor;

said working surface being superimposable with a removable markable surface;

a stylus allowing user marking on said markable surface when said working surface is superimposed with said markable surface, said stylus providing a stroke signal and a stroke mark, said stroke signal conveying to said recording unit a section of information, said stroke mark conveying to said markable surface said section of information; and said recording unit coupled to said first processor, wherein said recording unit, said markable surface, and said stylus provide a second user interface to said first processor.

16. The device of claim 15, wherein said second user interface further comprises said display, said device further comprising a logic design implementation coupled to said first processor, wherein said logic design implementation serves to switch among viewing modes for said display responsive to status of one or more of said keyboard and said recording unit, wherein said viewing modes include portrait and landscape modes, wherein said logic design implementation switches to portrait mode when said recording unit is in use, and wherein said logic design implementation switches to landscape mode when said keyboard is in use.

17. The device of claim 16, wherein said first and second processors are coupled to respective first and second logic design implementations which serve to synchronize information between said first and second processors.

18. The device of claim 15, wherein said display includes a touch screen, and wherein said touch screen provides a third user interface to said first processor.

19. The device of claim 15, wherein said stylus provides selectable first and second operating modes thereof, wherein said first operating mode serves to provide said stroke signal and said stroke mark, and wherein said second operating mode serves to provide a stroke signal for at least one of pointing and drawing with respect to said display.

20. The device of claim 15, wherein said stylus and said device include a wireless link therebetween.

21. The device of claim 15, wherein said stylus includes a microphone, and wherein said microphone provides a third user interface to said first processor.

22. A flexibly interfaceable portable computing device, comprising:

a first processor;

a display coupled to said first processor and a keyboard adapted to be coupled to said first processor, wherein said display and said keyboard provide a first user interface to said first processor;

a recording unit including a working surface thereon and said recording unit including a second processor;

said working surface being superimposable with a removable markable surface;

a stylus allowing user marking on said markable surface when said working surface is superimposed with said markable surface, said stylus providing a stroke signal and a stroke mark, said stroke signal conveying to said recording unit a section of information, said stroke mark conveying to said markable surface said section of information; and said recording unit adapted to be coupled to said first processor, wherein said recording unit, said markable surface, and said stylus provide a second user interface to said first processor.

23. The device of claim 22, wherein said second user interface further comprises said display.

24. The device of claim 23, further comprising:

a logic design implementation coupled to said first processor, wherein said logic design implementation serves to switch among viewing modes for said display responsive to status of one or more of said keyboard and said recording unit.

25. The device of claim 22, wherein said viewing modes include portrait and landscape modes, wherein said logic design implementation switches to portrait mode when said recording unit is coupled to said first processor and in use, and wherein said logic design implementation switches to landscape mode when said keyboard is coupled to said processor and in use.

26. The device of claim 22, wherein said display includes a touch screen, and wherein said touch screen provides a third user interface to said first processor.

27. The device of claim 22, wherein said stylus provides selectable first and second operating modes thereof, wherein said first operating mode serves to provide said stroke signal and said stroke mark, and wherein said second operating mode serves to provide a stroke signal for at least one of pointing and drawing with respect to said display.

28. The device of claim 22, wherein said stylus and said device include a wireless link therebetween.

29. The device of claim 22, wherein said stylus includes a microphone, and wherein said microphone provides a third user interface to said first processor.

30. A flexibly interfaceable portable computing device, comprising:

a first processor;

a display coupled to said first processor and a keyboard adapted to be coupled to said first processor, wherein said display and said keyboard provide a first user interface to said first processor;

a recording unit including a working surface thereon;

said working surface being superimposable with a removable markable surface;

a stylus allowing user marking on said markable surface when said working surface is superimposed with said markable surface, said stylus providing a stroke signal and a stroke mark, said stroke signal conveying to said recording unit a section of information, said stroke mark conveying to said markable surface said section of information;

said recording unit adapted to be coupled to said first processor, wherein said recording unit, said markable surface, and said stylus provide a second user interface to said first processor; and said recording unit having a second processor, wherein said first and second processors are coupled to respective first and second logic design implementations which serve to synchronize information between said first and second processors.

31. The device of claim 30, wherein said second user interface includes said display.

32. The device of claim 30, wherein said recording unit is selectively coupled to said first processor, and wherein said first and second logic design implementations serve to synchronize said information when said recording unit is coupled to said first processor.

33. The device of claim 30, wherein said display includes a touch screen, and wherein said touch screen provides a third user interface to said first processor.

34. The device of claim 30, wherein said stylus provides selectable first and second operating modes thereof, wherein said first operating mode serves to provide said stroke signal and said stroke mark, and wherein said second operating mode serves to provide a stroke signal for at least one of pointing and drawing with respect to said display.

35. The device of claim 30, wherein said stylus and said device include a wireless link therebetween.

36. The device of claim 30, wherein said stylus includes a microphone, and wherein said microphone provides a user interface to at least one of said first processor and said second processor.

37. A flexibly interfaceable portable computing device, comprising:
- a casing;
- a display connectable with said casing, said display being coupled to a first processor;
- a keyboard connectable with said casing, said keyboard adapted to be coupled to said first processor, wherein said display and said keyboard provide a first user interface to said first processor;
- a recording unit connectable with said casing and adapted to be coupled to said first processor, said recording unit including a working surface thereon and said recording unit including a second processor, said working surface being superimposable with a removable markable surface;
- a stylus allowing user marking on said markable surface when said working surface is superimposed with said markable surface, said stylus providing a stroke signal and a stroke mark, said stroke signal conveying to said recording unit a section of information, said stroke mark conveying to said markable surface said section of information, wherein said recording unit, said markable surface, and said stylus provide a second user interface to said first processor; and
- wherein said display, said keyboard, and said recording unit are enfoldable in said casing to present a slim profile.

38. The device of claim 37, wherein said second user interface includes said display.

39. The device of claim 37, wherein one or more of optical, electrical, wireless, infrared, radio-frequency and mechanical links allow said recording unit to be coupled to said first processor.

40. The device of claim 37, wherein one or more of optical, electrical, wireless, infrared, radio-frequency and mechanical links allow said keyboard to be coupled to said first processor.

41. The device of claim 37, wherein said display is pivotally connectable to said casing by a hinge.

42. The device of claim 37, wherein said keyboard is pivotally connectable to said casing by a hinge.

43. The device of claim 37, wherein said recording unit is pivotally connectable to said casing by a hinge.

44. The device of claim 37, wherein said casing includes one or more pockets.

45. The device of claim 37, wherein a portion of said casing comprises aluminum.

46. The device of claim 37, wherein an exterior surface of said casing includes leather.

47. The device of claim 37, wherein an exterior surface of said casing comprises a leather-like texture.

48. The device of claim 37, wherein said display includes a touch screen, and wherein said touch screen provides a third user interface to said processor.

49. The device of claim 37, wherein said stylus provides selectable first and second operating modes thereof, wherein said first operating mode serves to provide said stroke signal and said stroke mark, and wherein said second operating mode serves to provide a stroke signal for at least one of pointing and drawing with respect to said display.

50. The device of claim 37, wherein said stylus and said device include a wireless link therebetween.

51. The device of claim 37, wherein said stylus includes a microphone, and wherein said microphone provides a third user interface to said first processor.

52. A method of enhancing interface flexibility of a portable computing device having a display connectable with a casing, and a keyboard connectable with said casing, said display being, coupled to a first processor and said keyboard adapted to be coupled to said first processor, wherein said display and said keyboard provide a first user interface to said first processor, said method comprising:
- connecting a recording unit having a second processor with said casing, said recording unit adapted to be coupled to said first processor, said recording unit including a working surface thereon, said working surface being superimposable with a removable markable surface; and
- said markable surface being markable with a stylus when said working surface is superimposed with said markable surface, said stylus providing a stroke signal and a stroke mark, said stroke signal conveying to said recording unit a section of information, said stroke mark conveying to said markable surface said section of information, wherein said recording unit, said markable surface, and said stylus provide a second user interface to said first processor.

53. The method of claim 52, further comprising the step of connecting said display, said keyboard, and said recording unit to said casing such that said display, said keyboard, and said recording unit can be enfolded in said casing.

54. The method of claim 52, wherein at least one of said keyboard and said recording unit are detachably connected with said casing.

55. The method of claim 52, wherein said display includes a touch screen, and wherein said touch screen provides a third user interface to said first processor.

56. The method of claim 52, wherein said stylus provides selectable first and second operating modes thereof, wherein said first operating mode serves to provide said stroke signal and said stroke mark, and wherein said second operating mode serves to provide a stroke signal for at least one of pointing and drawing with respect to said display.

57. The method of claim 52, wherein said stylus and said device include a wireless link therebetween.

58. The method of claim 52, wherein said stylus includes a microphone, and wherein said microphone provides a third user interface to said first processor.

59. The device of claim 22, wherein said recording unit is coupled to said first processor by a mechanical connection.

60. A flexibly interfaceable portable computing device, comprising:
- a display coupled to a first processor;
- a keyboard adapted to be coupled to said first processor, wherein said display and said keyboard provide a first user interface to said first processor;
- a recording unit including a second processor;
- said recording unit adapted to be coupled to said first processor, wherein said recording unit provides a second user interface to said first processor; and
- wherein said display, said keyboard, and said recording unit are enfoldable to present a slim profile.

61. The device of claim 60 wherein said display and said keyboard are foldably connected to said recording unit.

62. The device of claim 60 further comprising a first region and a second region, wherein said keyboard and said display are located in said first region and said recording unit is located in said second region, and wherein said first region and said second region are pivotably connected.

63. The device of claim 60, wherein said recording unit comprises a working surface thereon, said working surface being superimposable with a removable markable surface.

64. The device of claim 63, further comprising a stylus allowing user marking on said markable surface when said working surface is superimposed with said markable surface, said stylus providing a stroke signal and a stroke mark, said stroke signal conveying to said recording unit a section of information, said stroke mark conveying to said markable surface said section of information, wherein said recording unit, said markable surface, and said stylus provide the second user interface to said processor.

65. The device of claim 64 wherein said display and said keyboard are foldably connected to said recording unit.

66. The device of claim 64 further comprising a first region and a second region, wherein said keyboard and said display are located in said first region and said recording unit is located in said second region, and wherein said first region and said second regions are pivotably connected.

67. A flexibly interfaceable portable computing device, comprising:
    a display coupled to a first processor wherein said display provides a first user interface to said processor;
    a recording unit including a second processor;
    said recording unit adapted to be coupled to said first processor, wherein said recording unit provides a second user interface to said first processor; and
    wherein said display and said recording unit are enfoldable to present a slim profile.

68. The device of claim 67 wherein said display is foldably connected to said recording unit.

69. The device of claim 67 further comprising a first region and a second region, wherein said display is located in said first region and said recording unit is located in said second region, and wherein said first region and said second regions are pivotably connected.

70. The device of claim 67, wherein said display includes a touch screen.

71. The device of claim 67, wherein said recording unit comprises a working surface thereon, said working surface being superimposable with a removable markable surface.

72. The device of claim 71, further comprising a stylus allowing user marking on said markable surface when said working surface is superimposed with said markable surface, said stylus providing a stroke signal and a stroke mark, said stroke signal conveying to said recording unit a section or information, said stroke mark conveying to said markable surface said section of information, wherein said recording unit, said markable surface, and said stylus provide a second user interface to said processor.

73. The device of claim 72 wherein said display is foldably connected to said recording unit.

74. The device of claim 72 further comprising a first region and a second region, wherein said display is located in said first region and said recording unit is located in said second region, and wherein said first region and said second region are pivotably connected.

* * * * *